(12) United States Patent
Toyoizumi et al.

(10) Patent No.: US 9,030,513 B2
(45) Date of Patent: May 12, 2015

(54) COLOR IMAGE FORMING APPARATUS HAVING DRIVE CURRENT ADJUSTMENT

(71) Applicant: Canon Kabushiki Kaisha, Tokyo (JP)

(72) Inventors: Kiyoto Toyoizumi, Susono (JP); Masaru Shimura, Yokohama (JP); Hideo Nanataki, Yokohama (JP); Kengo Kawamoto, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/338,649

(22) Filed: Jul. 23, 2014

(65) Prior Publication Data

US 2014/0334835 A1 Nov. 13, 2014

Related U.S. Application Data

(62) Division of application No. 13/472,935, filed on May 16, 2012, now Pat. No. 8,830,286.

(30) Foreign Application Priority Data

May 23, 2011 (JP) ................................. 2011-114859

(51) Int. Cl.
  *B41J 2/435* (2006.01)
  *G03G 15/043* (2006.01)
  *B41J 2/47* (2006.01)
  *G02B 26/12* (2006.01)
  *G03G 15/00* (2006.01)
  *G03G 21/00* (2006.01)

(52) U.S. Cl.
  CPC ............... *G03G 15/043* (2013.01); *B41J 2/471* (2013.01); *G02B 26/123* (2013.01); *G03G 15/5033* (2013.01); *G03G 21/0094* (2013.01)

(58) Field of Classification Search
  CPC ....... B41J 2/471; G02B 26/123; G03G 15/043; G03G 15/5033; G03G 21/0094
  USPC .............................................. 347/236; 399/51
  See application file for complete search history.

(56) References Cited

U.S. PATENT DOCUMENTS

2012/0230705 A1  9/2012  Shimura et al.
2013/0328992 A1  12/2013  Hayakawa et al.

FOREIGN PATENT DOCUMENTS

| JP | 08-171260 A | 7/1996 |
| JP | 2001-281944 A | 10/2001 |
| JP | 2002-206853 A | 7/2002 |
| JP | 2010-276881 A | 12/2010 |

*Primary Examiner* — Julian Huffman
*Assistant Examiner* — Carlos A Martinez
(74) *Attorney, Agent, or Firm* — Fitzpatrick, Cella, Harper & Scinto

(57) ABSTRACT

A color image forming apparatus has a light emitting element emitting light, a laser driving unit causing the light emitting element to emit light of a light amount at a first emission level for visualizing a toner image onto a first area where the toner image is to be visualized on a charged photosensitive member and to emit light of a light amount at a second emission level for weak emission onto a second area where the toner is not to be adhered to the charged photosensitive member. In addition, an acquiring unit acquires information of an integrated number of rotations of the photosensitive member, a drive current adjusting unit adjusts the drive current for the second emission level, and changes a magnitude of the drive current for the second emission level in accordance with the information of the integrated number of rotations of the photosensitive member.

15 Claims, 13 Drawing Sheets

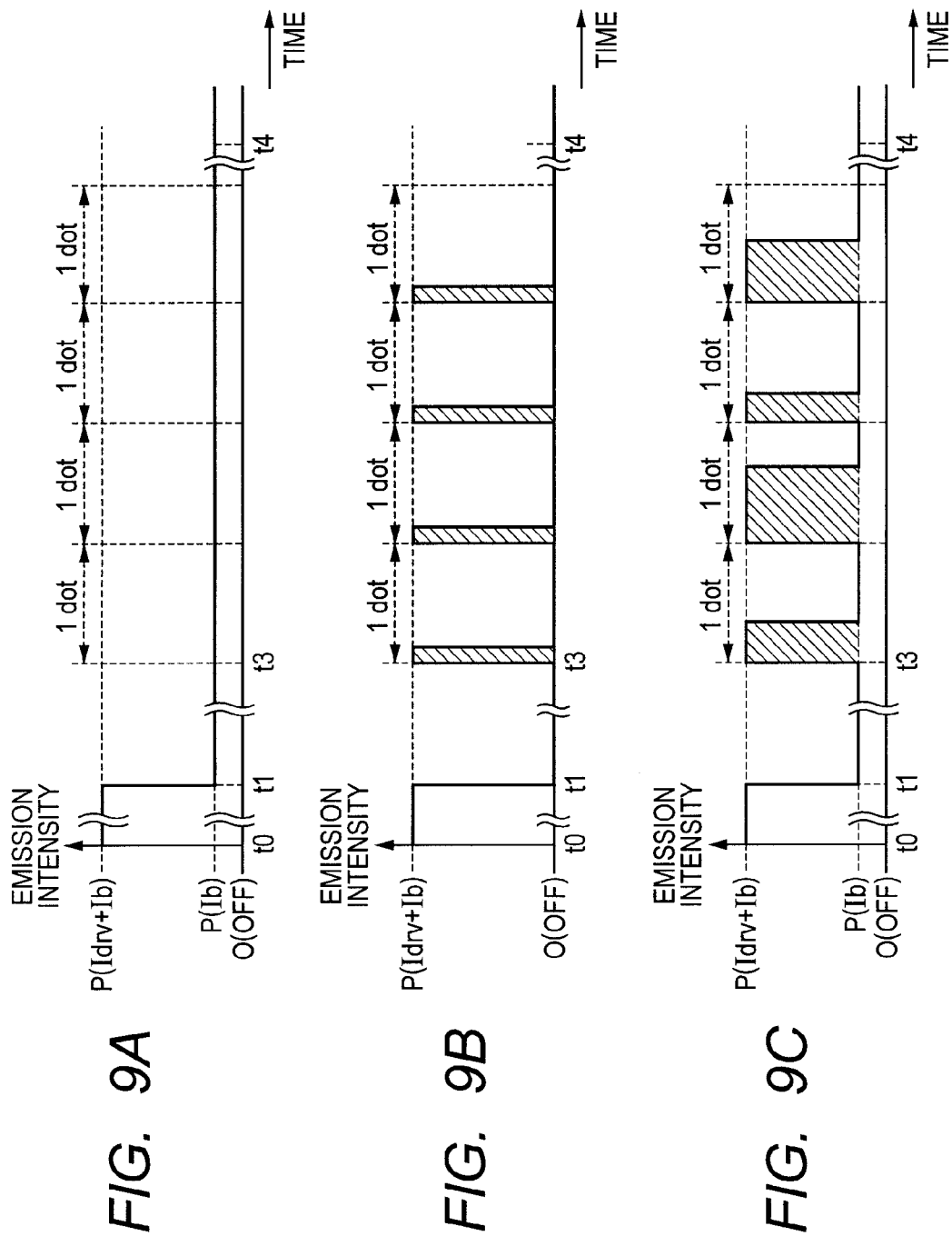

FIG. 12

| NUMBER OF ROTATIONS OF DRUM (×1000) | WEAK EXPOSURE | | GENERAL EXPOSURE | | | | |
|---|---|---|---|---|---|---|---|
| | μJ/cm² | EMISSION BRIGHTNESS (mW) | GENERAL EXPOSURE (DENSITY 0%) | | GENERAL EXPOSURE (DENSITY 100%) | | EMISSION BRIGHTNESS (mW) (ADDED EMISSION BRIGHTNESS) |
| | | | μJ/cm² | % (PWM) | μJ/cm² | % (PWM) | |
| 0≤r<37.5 | 0.030 | 0.42(Vref21=0.31V, PWM2 : 75%) | 0 | 0 | 0.25 | 100 | 3.50(3.08(Vref11=0.81V, PWM1 : 35.3%)) |
| 37.5≤r<75 | 0.047 | 0.66(Vref21=0.49V, PWM2 : 60.8%) | 0 | 0 | 0.30 | 100 | 4.2(3.54(Vref11=0.93V, PWM1 : 25.6%)) |
| 75≤r<112.5 | 0.068 | 0.95(Vref21=0.71V, PWM2 : 43.3%) | 0 | 0 | 0.36 | 100 | 5.04(4.09(Vref11=1.07V, PWM1 : 14.1%)) |
| 112.5≤r<150 | 0.093 | 1.30(Vref21=0.97V, PWM2 : 22.5%) | 0 | 0 | 0.41 | 100 | 5.74(4.44(Vref11=1.17V, PWM1 : 6.7%)) |
| 150≤r | 0.120 | 1.68(Vref21=1.25V, PWM2 : 0%) | 0 | 0 | 0.46 | 100 | 6.44(4.76(Vref11=1.25V, PWM1 : 0%)) |

COLOR IMAGE FORMING APPARATUS HAVING DRIVE CURRENT ADJUSTMENT

This application is a divisional of Application No. 13/472,935, filed May 16, 2012.

BACKGROUND OF THE INVENTION

1. Field of the Invention

The present invention relates to a color image forming apparatus utilizing an electrophotographic recording system, such as a laser printer, a copying machine, and a fax machine.

2. Description of the Related Art

Conventionally, there is known an image forming apparatus such as a copying machine and a laser printer, which use an electrophotographic recording system. In the image forming apparatus utilizing the electrophotographic recording system, for example, the following electrophotographic process is executed. First, a surface of a photosensitive drum is uniformly charged to, for example, −600 V by a charging device. After that, laser emission is performed by a laser exposure device to form an electrostatic latent image on the photosensitive drum. Then, toner image is adhered to the electrostatic latent image by a developing device to form a toner image, and the toner image is transferred onto a transfer member by a transfer device.

Residual toner on the photosensitive drum is removed by a drum cleaning device. Japanese Patent Application Laid-Open No. 2001-281944 describes the idea of removing the residual potential on the photosensitive drum by the light irradiation with a pre-exposure lamp to serve the photosensitive drum for the subsequent image formation.

SUMMARY OF THE INVENTION

In the electrophotographic image forming apparatus, in forming the electrostatic latent image on the surface of the photosensitive drum, prior control of a charge potential of the surface of the photosensitive drum is important. Particularly in the case of a color printer, it is necessary to cope with variability in photosensitivity characteristics of the respective photosensitive drums caused by the individual difference and usage difference thereof. As for the control of the charge potential, various control methods are proposed, such as a method using the pre-exposure lamp described above, but from the viewpoint of cost reduction and downsizing of the apparatus main body, a simpler configuration is desired.

The present invention has an object to solve at least one of the above-mentioned problem and other problems. For example, the present invention has an object to solve problems caused by a charge potential of a photosensitive drum by coping with variability or variations in photosensitivity characteristics (EV curve characteristics) of the photosensitive drums in an apparatus, and appropriately controlling the charge potential of each of the photosensitive drums with a simpler configuration.

According to an exemplary embodiment of the present invention, a color image forming apparatus which has a plurality of photosensitive members to be charged and a light irradiation unit irradiating at least one of the charged photosensitive members with light to form electrostatic latent image, the color image forming apparatus comprising: a laser driving unit causing the light irradiation unit to emit light in accordance with an input of print data, the laser driving unit causing the light irradiation unit to emit light of a light amount at a first emission level for printing when exposing an image portion and to emit light of a light amount at a second emission level for weak emission when exposing a non-image portion; an acquiring unit acquiring information associated with remaining lifetime of each of the photosensitive members; a first light intensity adjusting unit adjusting a first drive current for causing the light irradiation unit to emit light at the first emission level; and a second light intensity adjusting unit adjusting a second drive current for causing the light irradiation unit to emit light at the second emission level, the second light intensity adjusting unit changing a magnitude of the second drive current in accordance with the information associated with the remaining lifetime of each of the photosensitive members acquired by the acquiring unit.

Further features of the present invention will become apparent from the following description of exemplary embodiments with reference to the attached drawings.

BRIEF DESCRIPTION OF THE DRAWINGS

FIGS. 9A, 9B and 9C each illustrate a relationship between weak emission and PWM emission.

FIG. 12 shows an example of a table in which the photosensitive drum usage is associated with the general exposure parameter and the weak exposure parameter.

DESCRIPTION OF THE EMBODIMENTS

Hereinafter, exemplary embodiments of the present invention are described in detail with reference to the drawings. Note that, components described in the embodiments are merely an example, and the scope of the present invention is not limited to only those embodiments.

(First Embodiment)

Referring to FIGS. 1A to 10C, a configuration of a color image forming apparatus (hereinafter, simply referred to as an image forming apparatus) is described, and then, referring to FIGS. 11 and 12, control operation of weak exposure is described. Finally, referring to FIG. 13, an effect related to a fog amount is described.

(Schematic View of Cross-Section of Image Forming Apparatus)

Figure 1A:
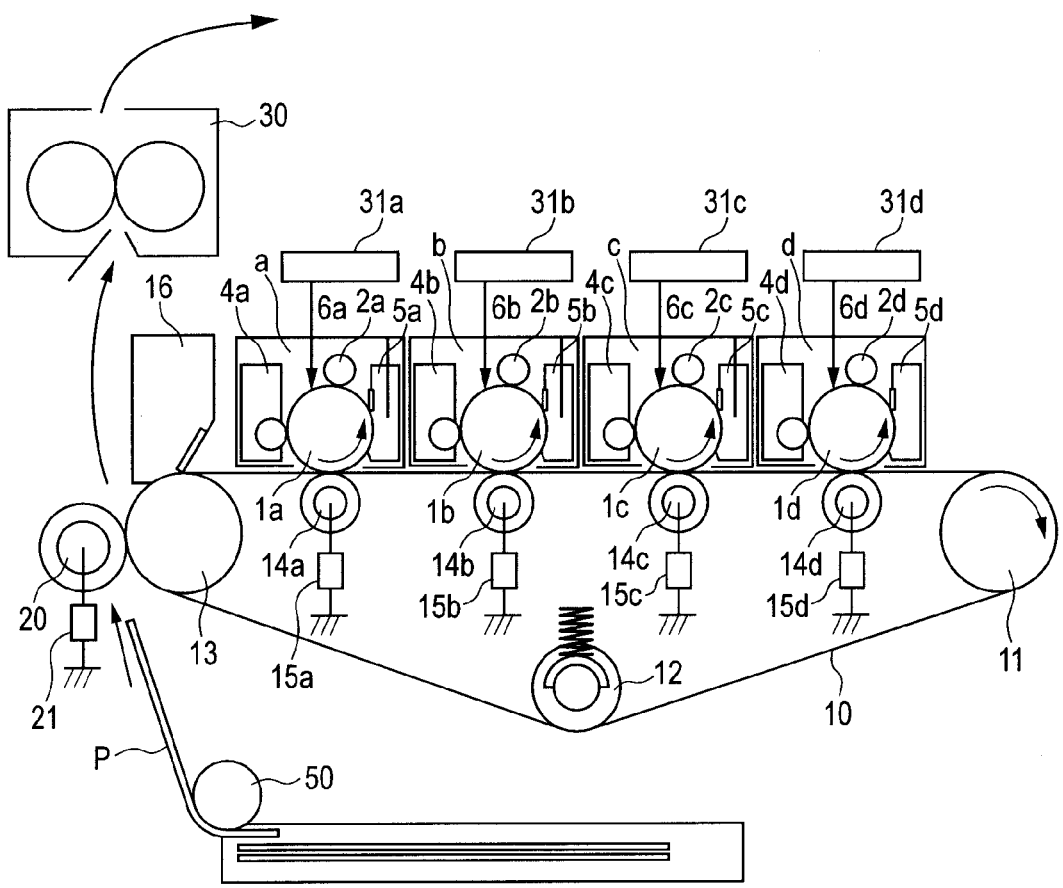
FIG. 1A schematically illustrates a cross-section of a color image forming apparatus.

FIG. 1A schematically illustrates a cross-section of the image forming apparatus. Referring to FIG. 1A, a configuration and operation of the image forming apparatus according to a first embodiment are described. The image forming apparatus includes first to fourth image forming stations a to d. The first image forming station is for yellow (hereinafter, represented by "Y"), the second image forming station is for magenta (hereinafter, represented by "M"), the third image forming station is for cyan (hereinafter, represented by "C"), and the fourth image forming station is for black (hereinafter, represented by "Bk"). Each of the image forming stations a to d includes a storage member (memory tag) (not shown) for storing a cumulative number of rotations of each of photosensitive drums 1a to 1d as information on lifetime of the photosensitive drum. Note that, other than the case where description for each color is necessary, reference symbols a to d are omitted as appropriate. Each of the image forming stations is replaceable with respect to a main body of the image forming apparatus. Further, each of the image forming stations is only required to include at least the photosensitive drum 1. The range of the members to be included in the image forming station so as to be replaceable is not particularly limited.

In the following, an operation of a first image forming station (Y) a is described as a representative example of the image forming stations. The image forming station a includes the photosensitive drum 1a serving as a photosensitive member. The photosensitive drum 1a is driven so as to rotate at a predetermined circumferential speed (process speed) in a direction of the arrow. In this rotation process, the photosensitive drum 1a is uniformly charged by a charging roller 2a to a charge potential having a predetermined polarity. Subsequently, through scanning of a laser beam 6a from an exposure device 31a serving as an exposure unit based on image data (image signal) supplied from outside, a surface of the photosensitive drum 1a corresponding to an image portion is exposed with light to remove charges, and thus an exposure potential Vl (VL) is formed on the surface of the photosensitive drum 1a. Subsequently, on an exposure potential Vl (VL) portion corresponding to the image portion, toner is developed due to a potential difference between the exposure potential Vl (VL) and a development potential Vdc applied to a developing device (yellow developing device) 4a serving as a first developing unit, to thereby be visualized. The image forming apparatus of this embodiment is a reversal development type image forming apparatus which performs image exposure by the exposure device 31a to develop the toner on the exposed portion.

An intermediate transfer belt 10 is suspended by suspension members 11, 12, and 13, and abuts against the photosensitive drum 1a. The intermediate transfer belt 10 is driven to rotate in the same direction and at substantially the same circumferential speed as the photosensitive drum 1a at an abutment position. A yellow toner image formed on the photosensitive drum 1a is transferred as follows. In a process in which the yellow toner image passes through an abutment portion (hereinafter, referred to as primary transfer nip portion) between the photosensitive drum 1a and the intermediate transfer belt 10, with a primary transfer voltage applied to a primary transfer roller 14a by a primary transfer power supply 15a, the yellow toner image is transferred onto the intermediate transfer belt 10 (primary transfer). Primary transfer residual toner remaining on the surface of the photosensitive drum 1a is cleaned and removed by a drum cleaner 5a serving as a cleaning unit. After that, the image forming process from the charging and the steps following the charging described above is repeated. Similarly, a magenta toner image (M) with the second color, a cyan toner image (C) with the third color, and a black toner image (Bk) with the fourth color are formed, and the toner images are transferred onto the intermediate transfer belt 10 while being sequentially overlapped one on top of another, thereby obtaining a composite color image.

In a process in which the four-color toner images on the intermediate transfer belt 10 pass through an abutment portion (hereinafter, referred to as secondary transfer nip portion) between the intermediate transfer belt 10 and a secondary transfer roller 20, a secondary transfer power supply 21 applies a secondary transfer voltage to the secondary transfer roller 20. With this, the four-color toner images on the intermediate transfer belt 10 are collectively transferred onto a surface of a recording material P fed from a sheet feeding roller 50. After that, the recording material P bearing the four-color toner images is introduced into a fixing device 30 to be heated and pressurized, and thus the four-color toners are melted and mixed to be fixed onto the recording material P. With the above-mentioned operation, a full-color toner image is formed on a recording medium. Secondary transfer residual toner remaining on the surface of the intermediate transfer belt 10 is cleaned and removed by an intermediate transfer belt cleaning device 16.

Description is made with reference to FIG. 1A of an example of the image forming apparatus including the intermediate transfer belt 10, but the present invention is not limited thereto. For example, the present invention may be implemented by utilizing an image forming apparatus, which includes a recording material conveyance belt (on a recording material carrier) and employs a method in which the toner image developed on the photosensitive drum is directly transferred onto the recording material conveyed by the recording material conveyance belt. Hereinafter, the image forming apparatus including the intermediate transfer belt 10 is described as an example.

(Cross-Section of Photosensitive Drum)

Figure 1B:
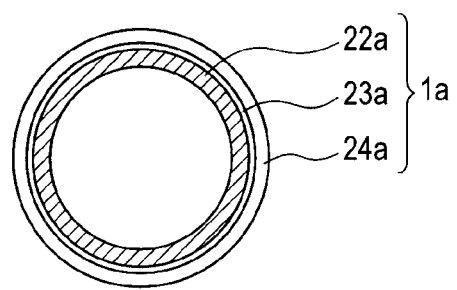
FIG. 1B illustrates a cross-section of a photosensitive drum.

FIG. 1B illustrates an example of a cross-section of the photosensitive drum 1a. In the photosensitive drum 1a, a charge generating layer 23a and a charge transporting layer 24a are laminated on a conductive support base member 22a. The conductive support base member 22a is an aluminum cylinder having an outer diameter of 30 mm and a thickness of 1 mm, for example. The charge generating layer 23a is a layer of a phthalocyanine-based pigment having a thickness of 0.2 μm, for example. The charge transporting layer 24a is a layer having a thickness of 20 μm, in which polycarbonate is used as a binder resin and an amine compound is contained as a charge transporting material, for example. FIG. 1B is an example of the photosensitive drum 1a, and dimensions and materials therefor are not limited to those described herein.

(Sensitivity Characteristics of Photosensitive Drum)

Figure 2:
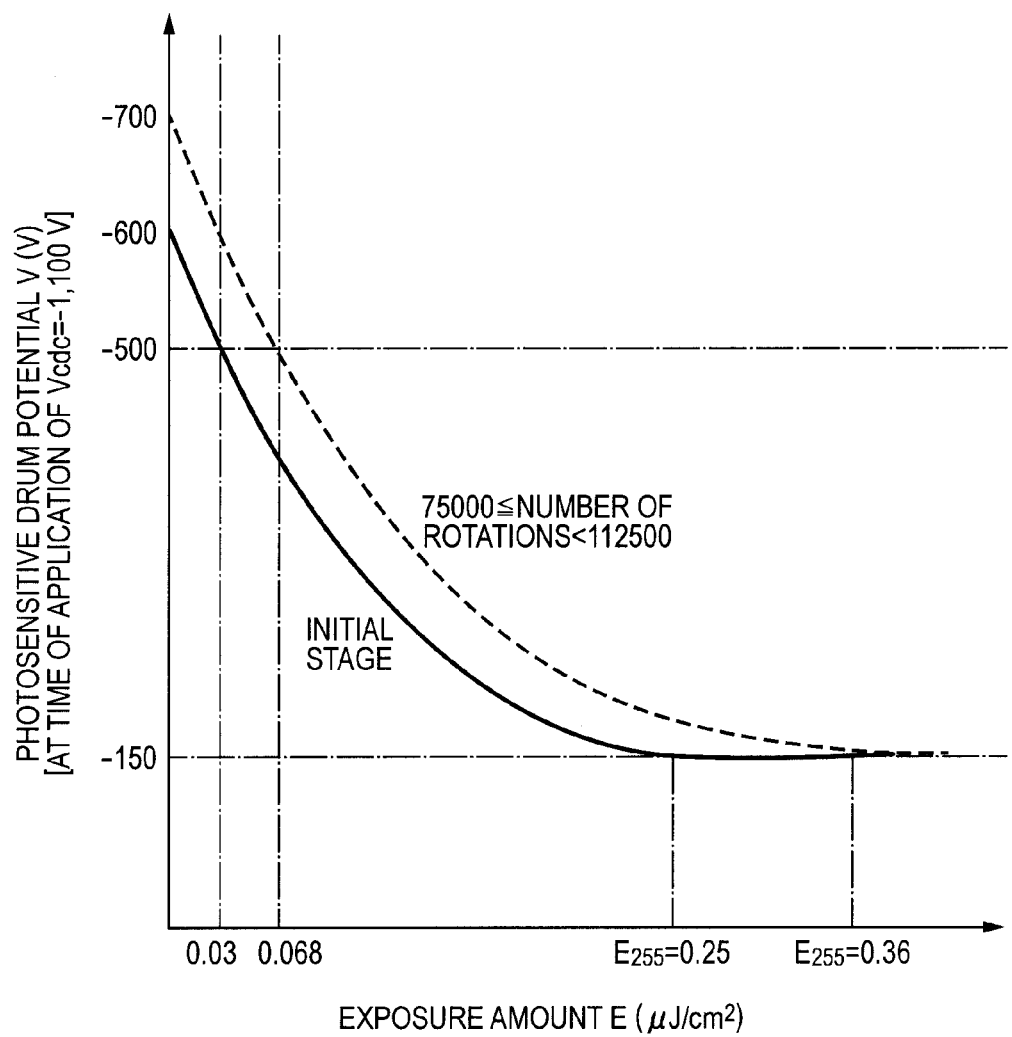
FIG. 2 illustrates an example of sensitivity characteristics (EV curve) of the photosensitive drum.

FIG. 2 is a graph illustrating an example of an EV curve representing the photosensitivity characteristics of the photosensitive drum 1, in which the lateral axis represents an exposure amount E ($\mu J/cm^2$) and the vertical axis represents the potential of the photosensitive drum 1 (photosensitive drum potential) (V). Vcdc represents a charge voltage, and this graph illustrates a case where −1,100 V is applied as the charge voltage Vcdc. FIG. 2 illustrates a potential decay in a case where the photosensitive drum 1 after charging, which has a surface charged to V, is exposed with laser beams so that the exposure amount is E ($\mu J/cm^2$) on the surface of the photosensitive drum. The EV curve shows that a larger potential decay is obtained by increasing the exposure amount E. A high potential portion has an intense electric field environment, and hence recombination of charge carriers (electron-hole pair) generated by the exposure is less likely to occur.

Therefore, a large potential decay is exhibited even with a small exposure amount. On the other hand, in a low potential portion, generated carriers are easily recombined, and hence there is observed a phenomenon that a potential decay is small even with an exposure of a large exposure amount. FIG. 2 illustrates an EV curve at an initial stage of usage of the photosensitive drum, and an EV curve when the photosensitive drum is continuously used. In FIG. 2, the curve in the broken line is the EV curve of the photosensitive drum with the number of rotations r of 75,000≤r<112,500, for example. The sensitivity characteristics of the photosensitive drum illustrated in FIG. 2 are an example, and photosensitive drums with various EV curves may be applied in the first embodiment.

(Regarding Charge/Development High Voltage Power Supply 52)

Figure 3A:
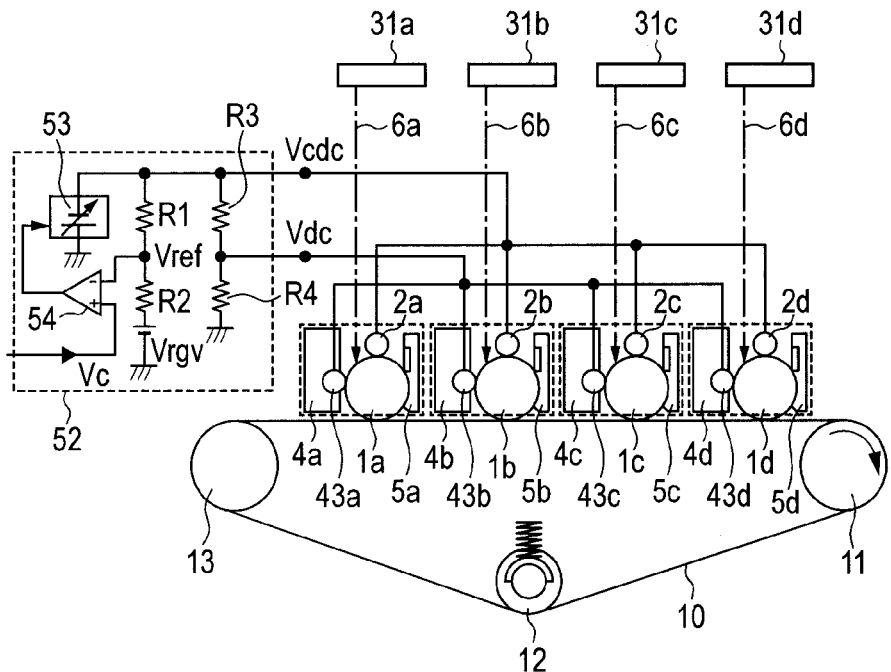
FIGS. 3A and 3B each illustrate a high voltage power supply circuit for charging rollers and developing rollers.
Figure 3B:
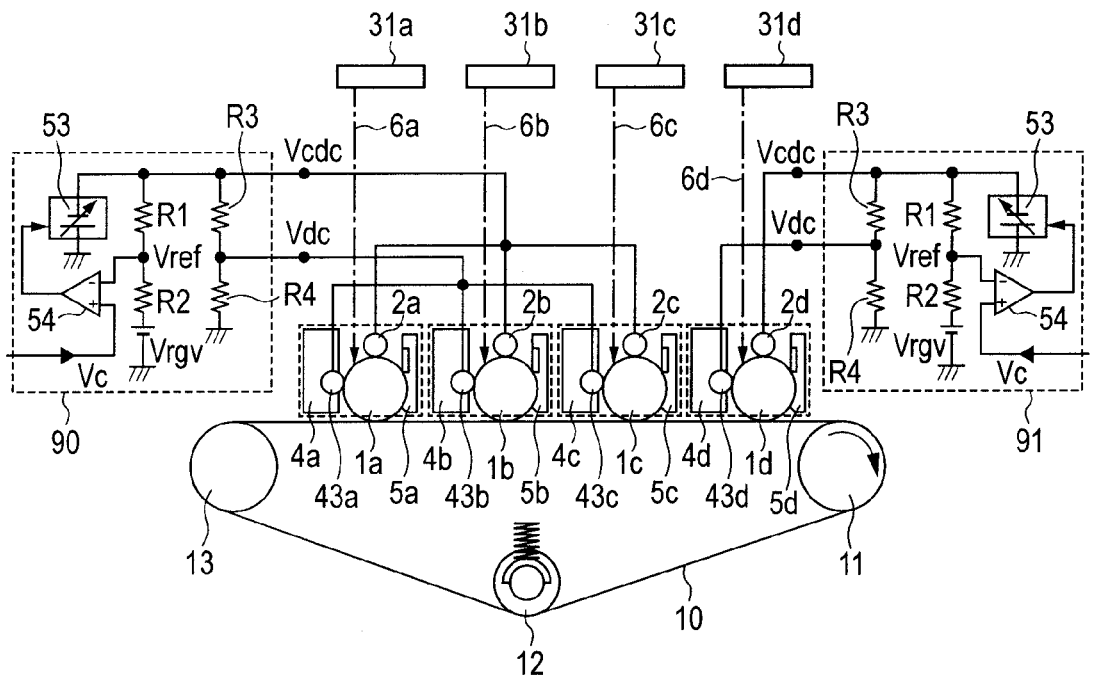

Next, referring to FIGS. 3A and 3B, a charge/development high voltage power supply is described. FIGS. 3A and 3B illustrate examples of the charge/development high voltage power supply. In the example of FIG. 3A, charging rollers 2a to 2d respectively corresponding to the multiple colors, and developing rollers 43a to 43d respectively corresponding to the multiple colors are connected to a charge/development high voltage power supply 52. The charge/development high voltage power supply 52 supplies the charge voltage Vcdc (power supply voltage) output from one transformer 53 to the charging rollers 2a to 2d. Further, the charge/development high voltage power supply 52 supplies a development voltage Vdc obtained through division by two resistor elements R3 and R4 to the developing rollers 43a to 43d. In the power supply circuits illustrated in FIGS. 3A and 3B, the power supply system is simplified, and hence voltages input (applied) to the respective rollers can be collectively adjusted while maintaining a predetermined relationship. Meanwhile, individual adjustment (individual control) cannot be performed independently among the colors. The same applies to the developing roller 43.

Here, the resistor elements R3 and R4 may be configured by any one of a fixed resistor, a pre-set variable resistor, and a variable resistor. In FIG. 3A, the power supply voltage itself from the transformer 53 is directly input to the charging rollers 2a to 2d, and a divided voltage obtained by dividing the voltage output from the transformer 53 by the fixed voltage dividing resistors is directly input to the developing rollers 43a to 43d. However, this is merely an example, and the voltage input form is not limited thereto. Various forms for inputting a voltage to the individual rollers (charging unit and developing unit) may be employed.

For example, instead of the output itself from the transformer 53, the following voltage may be output. That is, a conversion voltage (post-conversion voltage) obtained by DC-DC converting the output from the transformer 53 by a converter, or a voltage obtained by at least one of dividing and dropping the power supply voltage or the conversion voltage by an electronic element having fixed voltage drop characteristics may be input to the charging rollers 2a to 2d. Further, the conversion voltage obtained by DC-DC converting the output from the transformer 53 by the converter, or the voltage obtained by at least one of dividing and dropping the power supply voltage or the conversion voltage by the electronic element having the fixed voltage drop characteristics may be input to the developing rollers 43a to 43d. Examples of the electronic element having the fixed voltage drop characteristics include a resistor element and a zener diode. The converter includes an adjustable regulator. At least one of dividing and dropping a voltage by the electronic element includes a case of further dropping the divided voltage, and an inverse case thereof, for example.

Meanwhile, in order to control the charge voltage Vcdc to be substantially constant, a negative voltage obtained by dropping the charge voltage Vcdc by R2/(R1+R2) is offset by a reference voltage Vrgv toward a positive polarity to be set as a monitor voltage Vref, and feedback control is performed so that the monitor voltage Vref is kept at a constant value. Specifically, a control voltage Vc preset in an engine controller 122 (CPU) (see FIG. 5) is input to a positive terminal of an operational amplifier 54, whereas the monitor voltage Vref is input to a negative terminal thereof. The engine controller 122 changes the control voltage Vc as appropriate depending on situations at each time. Then, the control/drive system of the transformer 53 is feedback-controlled by an output value of the operational amplifier 54 so that the monitor voltage Vref becomes equal to the control voltage Vc. With this, the charge voltage Vcdc output from the transformer 53 is controlled to become a target value. Regarding the output control of the transformer 53, the output of the operational amplifier 54 may be input to the CPU, and the results of the computation by the CPU may be reflected to the control/drive system of the transformer 53. In this embodiment, control is performed so that the charge voltage Vcdc is −1,100 V, and the development voltage Vdc is −350 V. Under this control, the charging rollers 2a to 2d uniformly charge the surfaces of the photosensitive drums 1a to 1d, respectively, to a charge potential Vd.

Further, FIG. 3B illustrates another example of the charge/development high voltage power supply. The same components as those of FIG. 3A are denoted by the same reference symbols, and description thereof is omitted. In FIG. 3B, the power supply is divided into at least two power supplies, that is, a charge/development high voltage power supply 90 for the image forming stations of YMC colors and a charge/development high voltage power supply 91 for the image forming station of a Bk color. When an image is formed in a full-color mode, the charge/development high voltage power supplies 90 and 91 are turned ON. When an image is formed in a monochrome mode, the charge/development high voltage power supply 90 for the image forming stations of YMC colors is not operated (turned OFF), and the charge/development high voltage power supply 91 for the image forming station of a Bk color is turned ON. In the case of FIG. 3B, the same description as in the case of FIG. 3A applies to the charge/development high voltage power supply 90 for the image forming stations of YMC colors.

With use of the charge/development high voltage power supplies of FIGS. 3A and 3B, because the high voltage power supply is shared among the multiple charging rollers and developing rollers, further downsizing of the apparatus can be realized. Further, the cost can be suppressed as compared to the case where transformers which output variable voltages are provided for the respective colors, and the voltages to be input to the respective charging rollers and the respective developing rollers are individually controlled. In addition, the cost can be suppressed as compared to the case where DC-DC converters (adjustable regulators) are provided to the respective charging rollers and the respective developing rollers, thereby controlling the output from one transformer individually for the respective charging rollers and the respective developing rollers.

(Appearance of Light Scanning Device)

Figure 4:
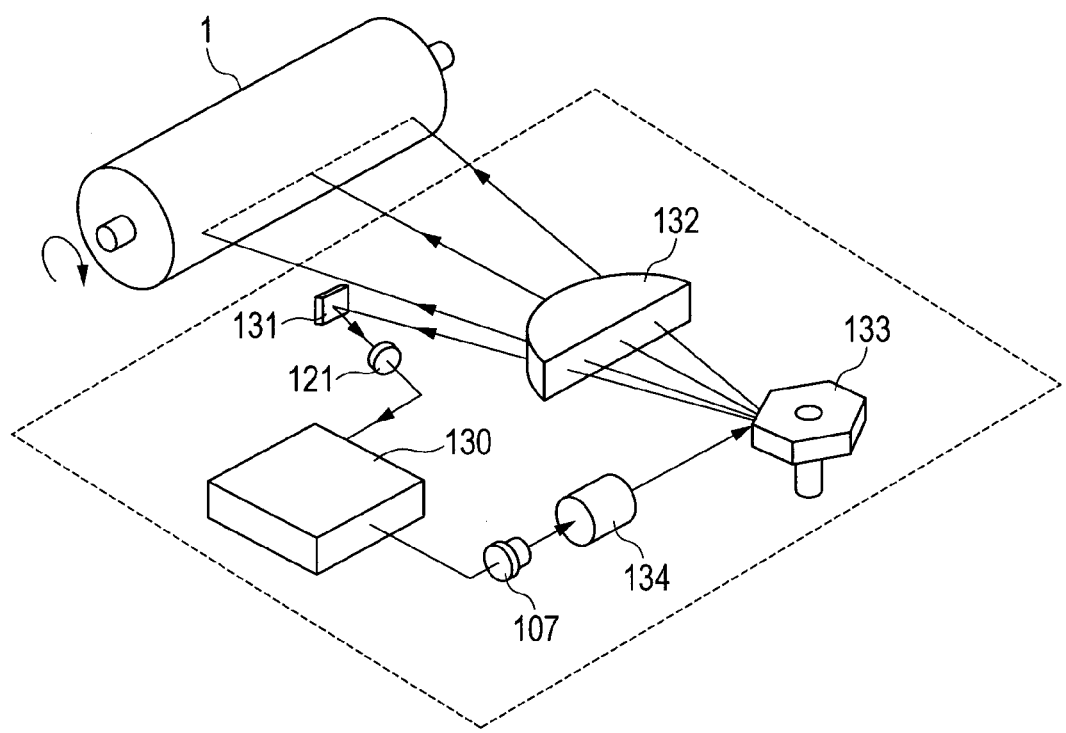
FIG. 4 illustrates an example of an appearance of an optical scanning device.

FIG. 4 is a view of a representative appearance of a light scanning device. Through a laser diode 107 (hereinafter, referred to as LD 107) serving as a light emitting element, a drive current flows owing to the operation of a laser drive system circuit 130. The LD 107 emits laser beams at an intensity level corresponding to the drive current. The laser drive system circuit 130 (hereinafter, referred to as LD driver 130) is a circuit for driving the LD 107 electrically connected to the engine controller 122 and a video controller 123 to be described later. The laser beams emitted by the LD 107 are shaped by a collimator lens 134, and are aligned as parallel beams to be scanned in a horizontal direction of the photosensitive drum 1 by a polygon mirror 133. The scanned laser beams are imaged by an fθ lens 132 on the surface of the photosensitive drum 1 rotating in a direction of the arrow about a rotation shaft thereof. Thus, dot exposure is performed.

A reflective mirror 131 is provided so as to correspond to a scanning position of the photosensitive drum 1 on one end side thereof, to thereby reflect the laser beam projected to a scanning start position toward a BD synchronization detection sensor 121 (hereinafter, referred to as BD detection sensor). With the output of the BD detection sensor 121, the scanning start timing of the laser beam is determined. At the time of forced emission in detection of the laser beam, auto power control (APC) is performed, which is automatic light amount control for controlling the laser light amount to a desired light amount, and thus the emission level of the laser is adjusted.

(Laser Drive System Circuit)

Figure 5:
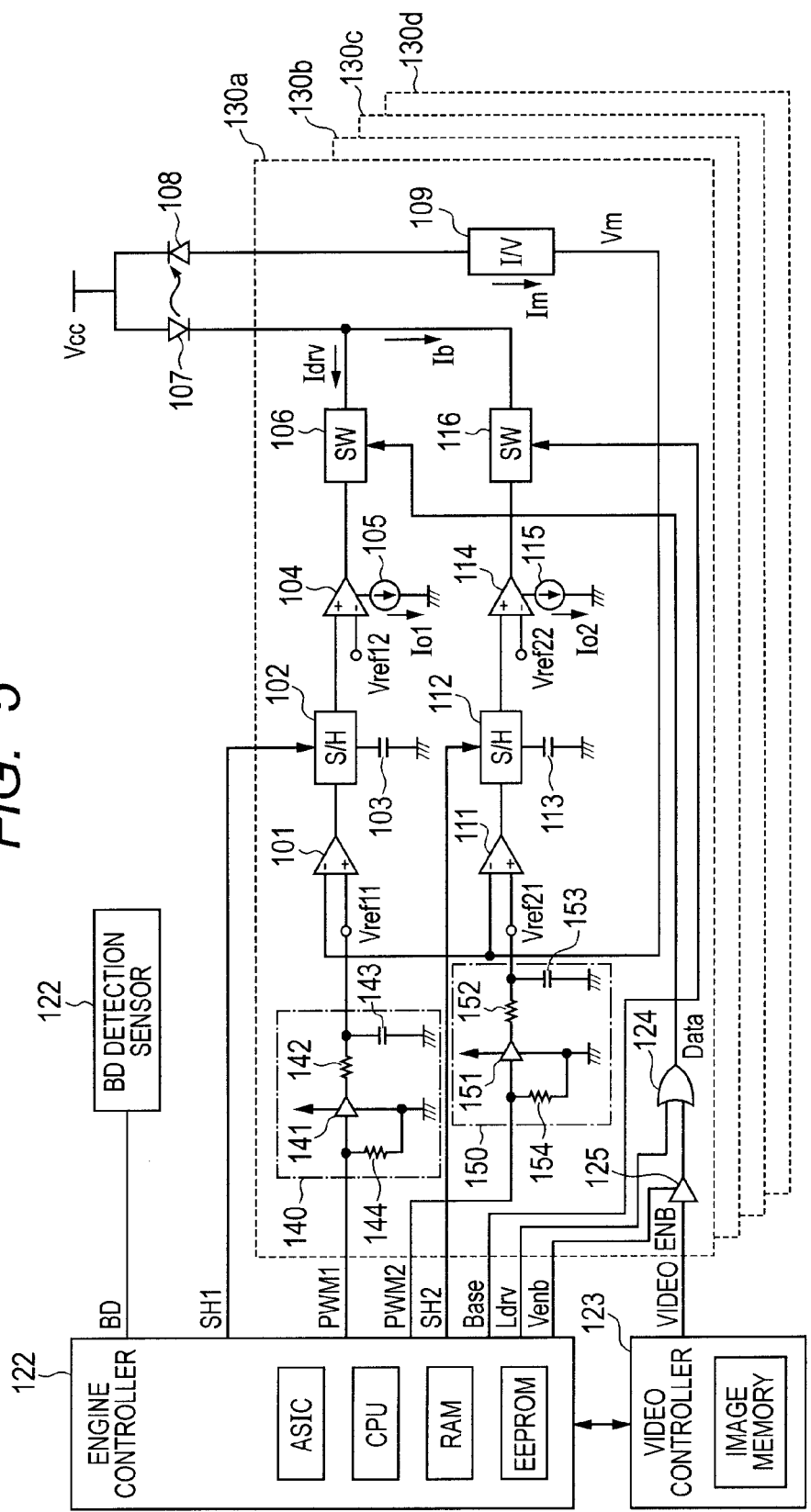
FIG. 5 illustrates an example of a laser drive circuit having a two-level light intensity adjusting function.

FIG. 5 is a laser drive system circuit for automatically adjusting the light amount level of the LD 107 for the purpose of performing weak emission so as to prevent adhesion of toner on the photosensitive drum 1 and prevent the positive or reversal fog in the non-image portion. In FIG. 5, the LD driver 130 illustrated in FIG. corresponds to a portion surrounded by a dotted line frame 130a. Configurations in dotted line frames 130b to 130d of FIG. 5 are the same as that in the dotted line frame 130a. The configurations in the dotted line frames 130a to 130d correspond to LD drivers for respective colors in the color image forming apparatus. Hereinafter, the configuration of the LD driver 130 for a specific color is described. The LD drivers 130 for the other colors have the same configuration, and hence overlapping description is omitted. Hereinafter, description is made of FIG. 5.

The LD driver 130 includes PWM smoothing circuits 140 and 150 (alternate long and short dash lines), comparator circuits 101 and 111, sample/hold circuits 102 and 112, and hold capacitors 103 and 113. The LD driver 130 further includes current amplifier circuits 104 and 114, reference current sources (constant current circuits) 105 and 115, switching circuits 106 and 116, and a current voltage conversion circuit 109. Hereinafter, a photodiode 108 is referred to as PD 108. The comparator circuit 101, the sample/hold circuit 102, the hold capacitor 103, the current amplifier circuit 104, the reference current source 105, and the switching circuit 106 correspond to a first light intensity adjusting portion. The comparator circuit 111, the sample/hold circuit 112, the hold capacitor 113, the current amplifier circuit 114, the reference current source 115, and the switching circuit 116 correspond to a second light intensity adjusting portion. An emission level for normal printing and an emission level for weak emission, which are described later, are independently controllable by the first light intensity adjusting portion and the second light intensity adjusting portion, respectively.

The engine controller 122 incorporates an ASIC, a CPU, a RAM, and an EEPROM. Further, the engine controller 122 performs printer engine control and control of communication to the video controller 123.

The engine controller 122 outputs a PWM signal PWM1 to the PWM smoothing circuit 140. The PWM smoothing circuit 140 includes an inverter circuit 141, resistors 142 and 144, and a capacitor 143. The inverter circuit 141 inverts the PWM signal PWM1. An output of the inverter circuit 141 charges the capacitor 143 via the resistor 142, and is smoothed by the capacitor 143 to be a voltage signal. The smoothed voltage signal is input to a terminal of the comparator circuit 101 as a reference voltage Vref11. The reference voltage Vref11 is determined by a pulse width of the PWM signal PWM1, and is controlled by the engine controller 122.

The engine controller 122 outputs a PWM signal PWM2 to the PWM smoothing circuit 150. The PWM smoothing circuit 150 includes an inverter circuit 151, resistors 152 and 154, and a capacitor 153. The inverter circuit 151 inverts the PWM signal PWM2. An output of the inverter circuit 151 charges the capacitor 153 via the resistor 152, and is smoothed by the capacitor 153 to be a voltage signal. The smoothed voltage signal is input to a terminal of the comparator circuit 111 as a reference voltage Vref21. The reference voltage Vref21 is determined by a pulse width of the PWM signal PWM2, and is controlled by the engine controller 122. Both the reference voltages Vref11 and Vref21 may be directly output without an instruction of the PWM signal from the engine controller 122.

An OR circuit 124 has input terminals to which an Ldry signal from the engine controller 122 and a VIDEO signal from the video controller 123 are input. The OR circuit 124 outputs a Data signal to the switching circuit 106. The VIDEO signal is based on print data sent from an external device, such as a reader scanner which is externally connected or a host computer. The VIDEO signal is driven by, for example, image data having an 8-bit (=256 levels) multivalued signal (0 to 255), and determines a laser emission period. A pulse width when the image data is 0 (background portion) is $PW_{MIN}$ (for example, 0.0% of a pulse width for one pixel). When the image data is 255, which means full exposure, the pulse width corresponds to one pixel ($PW_{255}$). Regarding image data of values ranging from 1 to 254, a pulse width ($PW_X$) proportional to a gradation value between $PW_{MIN}$ and $PW_{255}$ is generated, which is expressed by Expression (1).

$$PW_n = n \times (PW_{255} - PW_{MIN})/255 + PW_{MIN} \quad \text{Expression (1)}$$

The case where the image data for controlling the laser diode 107 is 8 bits (=256 levels) is an example. For example, the image data may be a multivalued signal of 4 bits (=16 levels) or 2 bits (=4 levels) after halftone processing. The image data after halftone processing may be a binary signal.

The VIDEO signal, which is output from the video controller 123, is input to a buffer 125 with enable terminal (ENB). An output of the buffer 125 is input to the OR circuit 124. The enable terminal is connected to a signal line to which a Venb signal from the engine controller 122 is output.

The engine controller 122 outputs an SH1 signal, an SH2 signal, a Base signal, the Ldry signal, and the Venb signal. The Venb signal is a signal for subjecting the Data signal based on the VIDEO signal to mask processing. Through setting of the Venb signal to a disabled state (OFF state), a timing for an image mask region (image mask period) can be produced.

To positive terminals of the comparator circuits 101 and 111, the first reference voltage Vref11 and the second reference voltage Vref21 are input, respectively. Outputs of the comparator circuits 101 and 111 are input to the sample/hold circuits 102 and 112, respectively. The reference voltage Vref11 is set as a target voltage for causing the LD 107 to emit light at the emission level for normal printing (first emission level or first light amount). The reference voltage Vref21 is set as a target voltage for the emission level for weak emission (second emission level or second light amount). The sample/hold circuits 102 and 112 are connected to the hold capacitors 103 and 113, respectively. Outputs of the sample/hold circuits 102 and 112 are input to positive terminals of the current amplifier circuits 104 and 114, respectively.

The current amplifier circuits 104 and 114 are connected to the reference current sources 105 and 115, respectively. Outputs of the current amplifier circuits 104 and 114 are input to the switching circuits 106 and 116, respectively. To negative terminals of the current amplifier circuits 104 and 114, a third reference voltage Vref12 and a fourth reference voltage Vref22 are input, respectively. A current Io2 (first drive current) is determined in accordance with a difference between an output voltage of the sample/hold circuit 102 and the reference voltage Vref12. A current Io2 (second drive current) is determined in accordance with a difference between an output voltage of the sample/hold circuit 112 and the reference voltage Vref22. The reference voltages Vref12 and Vref22 are set for determining the currents.

The switching circuit 106 is turned ON and OFF based on the Data signal, which is a pulse modulated data signal. The switching circuit 116 is turned ON and OFF based on the input signal Base. Output terminals of the switching circuits 106 and 116 are connected to a cathode of the LD 107, thereby supplying drive currents Idrv and Ib. An anode of the LD 107 is connected to a power supply Vcc. A cathode of the photodiode 108 (hereinafter, referred to as PD 108) for monitoring the light amount of the LD 107 is connected to the power supply Vcc. An anode of the PD 108 is connected to the current voltage conversion circuit 109, thereby causing a monitor current Im to flow through the current voltage conversion circuit 109. With this, the current voltage conversion circuit 109 converts the monitor current Im into a monitor voltage Vm. The monitor voltage Vm is negatively fed back to negative terminals of the comparator circuits 101 and 111.

In FIG. 5, the engine controller 122 and the video controller 123 are illustrated separately, but the present invention is not limited to this form. For example, a part or whole of the engine controller 122 and the video controller 123 may be constituted by the same controller. Similarly, a part or whole of the LD driver 130 surrounded by the dotted line frame of FIG. 5 may be built in the engine controller 122, for example.

(Description of APC for P(Idrv))

Next, the APC for P(Idrv) is described. The engine controller 122 sets the sample/hold circuit 112 to a hold state (non-sampling period) by an instruction of the SH2 signal, and sets the switching circuit 116 to an operation OFF state by the input signal Base. The engine controller 122 sets the sample/hold circuit 102 to a sampling state by an instruction of the SH1 signal, and turns ON the switching circuit 106 by the Data signal. More specifically, at this time, the engine controller 122 controls (instructs) the Ldry signal to set the Data signal so as to obtain an emission state of the LD 107. This period during which the sample/hold circuit 102 is in the sampling state corresponds to an APC operation period.

Under this state, when the LD 107 becomes a full emission state, the PD 108 monitors the emission intensity (emission amount) of the LD 107, and a monitor current Im1 proportional to the emission intensity flows. Then, the monitor current Im1 is caused to flow through the current voltage conversion circuit 109, and the current voltage conversion circuit 109 converts the monitor current Im1 into a monitor voltage Vm1. The current amplifier circuit 104 controls the drive current Idrv based on the current Io1 flowing through the reference current source 105 so that the monitor voltage Vm1 matches the first reference voltage Vref11, which is a target value.

During a non-APC operation period, that is, during normal image formation, the sample/hold circuit 102 is in a hold period (non-sampling period). The switching circuit 106 is turned ON and OFF in accordance with the Data signal, thereby subjecting the drive current Idrv to pulse width modulation.

(Description of APC for P(Ib))

Next, the APC for P(Ib) is described. The engine controller 122 sets the sample/hold circuit 102 to a hold state (non-sampling period) by an instruction of the SH1 signal, and sets the switching circuit 106 to an operation OFF state by the Data signal. Regarding the Data signal, the engine controller 122 sets the Venb signal, which is connected to the enable terminal of the buffer with enable terminal 125, to a disabled state, and controls the Ldry signal to turn OFF the Data signal. Further, the engine controller 122 sets the sample/hold circuit 112 to a sampling state (that is, an APC operation period) by an instruction of the SH2 signal, and turns ON the switching circuit 116 by the input signal Base so that the LD 107 is set to a weak emission state.

Under this state, when the LD 107 becomes a full weak emission state (lighting maintained state) in which the light amount is weak, the PD 108 monitors the emission intensity of the LD 107, and a monitor current Im2 (Im1>Im2) proportional to the emission intensity flows. Then, the monitor current Im2 is caused to flow through the current voltage conversion circuit 109, and the current voltage conversion circuit 109 converts the monitor current Im1 into a monitor voltage Vm2. The current amplifier circuit 114 controls the drive current Ib based on the current Io2 flowing through the reference current source 115 so that the monitor voltage Vm2 matches the second reference voltage Vref21, which is a target value.

During the non-APC operation period, that is, during the normal image formation (period in which an image signal is sent), the sample/hold circuit 112 is in a holding period (non-sampling period), and the full weak emission state in which the light amount is weak is maintained.

If the positive fog, the reversal fog, and the like of toner can be neglected, it is only necessary to set the laser emission amount for weak emission to an appropriate laser emission amount (intensity) at which the charge potential does not fall below the development potential, but this is impractical. That is, when the positive fog, the reversal fog, and the like of toner are taken into consideration, it is necessary to keep the light amount for P(Ib) always stable during image formation.

(Description of Weak Emission Level)

Figure 6A:
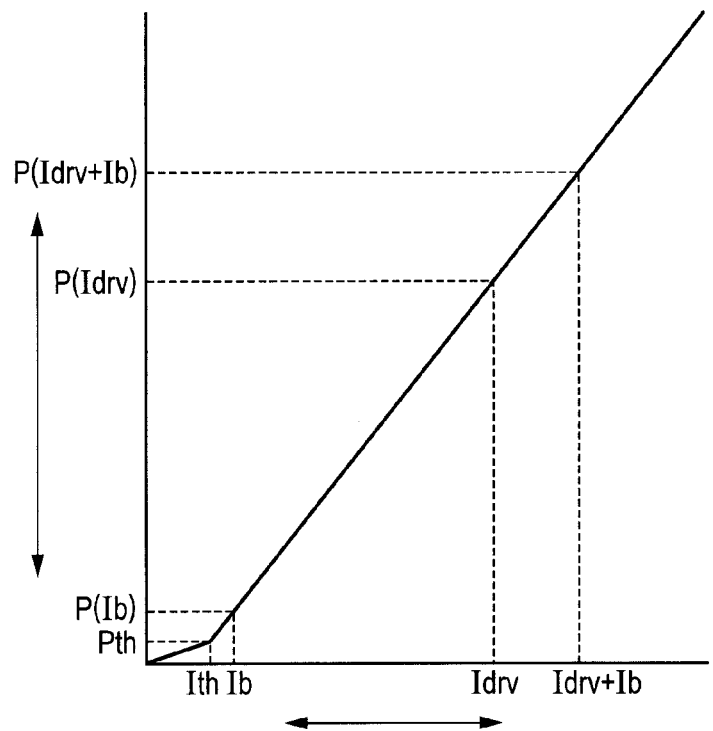
FIGS. 6A and 6B illustrate a relationship between a current flowing through a laser diode and emission intensity.

In the description above, the drive current Ib under the full weak emission state is set so as to exceed a threshold current Ith of the LD 107 illustrated in FIG. 6A to be the weak emission level P(Ib). FIG. 6A is a graph illustrating a relationship between each laser emission intensity and each current value. The weak emission level means an emission intensity level at which a developing material such as toner is practically not adhered by charging (not visualized) on the photosensitive drum by laser irradiation at that level, and at which a toner fog state is suppressed. The emission intensity of the emission level P(Ib) is in a laser emission region. If the emission level P(Ib) at this time is in an LED emission region in which the emission level is below the emission level of the laser emission region, a wavelength distribution in a spectrum significantly spreads, resulting in a wavelength distribution which is wider than the rated laser wavelength. Accordingly, the sensitivity of the photosensitive drum is disturbed, and the surface potential becomes unstable. Therefore, the emission level P(Ib) needs to be in the laser emission region whose emission level exceeds that of the LED emission region.

During the normal image formation, the drive current Idrv+Ib is set so as to be the emission level corresponding to the intensity of a print level P(Idrv+Ib). The print level means an emission intensity level at which the charge adhesion of a developing material on the photosensitive drum becomes saturated.

Vcdc (charge voltage), which has been described with reference to FIGS. 3A and 3B, is set to be variable depending on parameters such as the environment and the degree of deterioration (usage) of the photosensitive drum. From the viewpoint of maintaining image quality, it is also necessary to set the light amount of the target weak emission level (intensity of the second emission level) to be variable depending on the same parameters. For example, as the value of Vcdc becomes larger, a light amount of a weak emission level Ebg1 also becomes larger, and, on the other hand, as the value of Vcdc becomes smaller, the light amount of the weak emission level Ebg1 also becomes smaller. Details are described later.

(Description of Light Emission at P(Ib+Idrv))

In a case where the LD 107 is caused to emit light at the emission level for normal printing, the circuit of FIG. 5 is operated as follows. The sample/hold circuit 112 is set to a hold period, and the switching circuit 116 is turned ON. Further, the sample/hold circuit 102 is set to a hold period, and the switching circuit 106 is turned ON. With this, the drive current Idrv+Ib is supplied. When the switching circuit 106 is turned OFF, the weak emission level P(Ib) of the drive current Ib is obtained.

The print level P(Idrv+Ib) is an emission intensity obtained by superimposing, on the weak light emission level P(Ib), the PWM light emission level P(Idrv) resulting from pulse width modulation. More specifically, the switching circuit 106 is turned ON and OFF by the Data signal (VIDEO signal) under a state in which SH2 and SH1 are set to the hold period and the Base signal is set to be ON and in which the engine controller 122 sets the Venb signal to an enabled state. With this, two-level emission can be performed between Ib and Idrv+Ib in terms of drive current, that is, between P(Ib) and P(Idrv+Ib) in terms of emission intensity (see arrows of FIG. 6A). Further, regarding the light amount at P(Idrv+Ib), laser emission is performed based on P(Ib) for a time period in accordance with a pulse duty.

Through the operation of the circuit of FIG. 5, the engine controller 122 can perform the APC of the LD 107 for the weak emission level, thereby causing the LD 107 to emit light at the weak emission level P(Ib). Further, with the use of the Data signal resulting from the VIDEO signal sent from the video controller 123, light can be emitted at the print level P(Idrv+Ib), which is the first level in the laser emission region. In this manner, the two emission levels can be obtained.

(Another Laser Drive System Circuit)

Figure 6B:
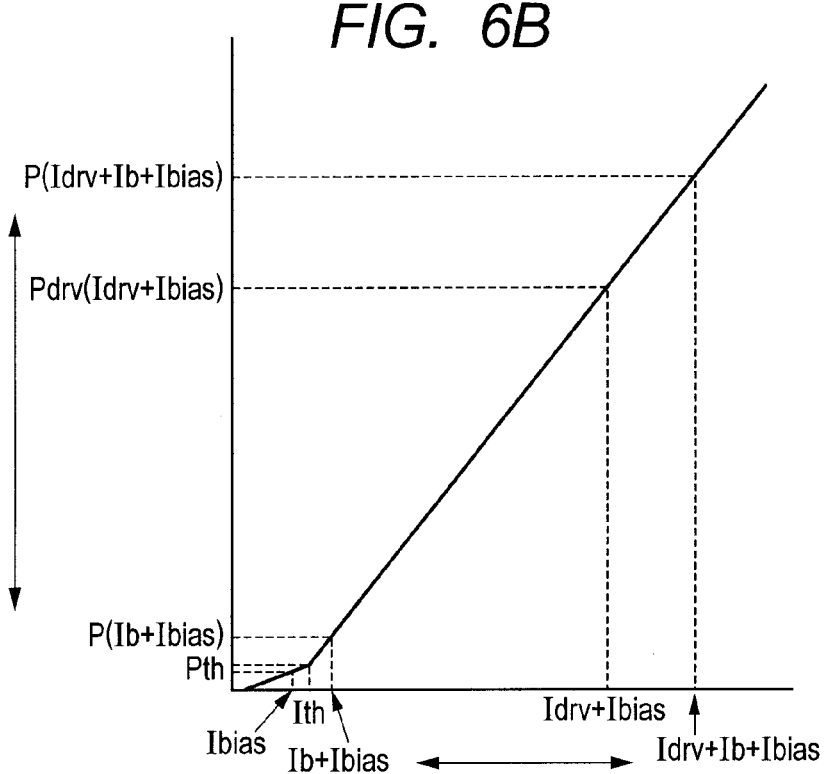
Figure 7:
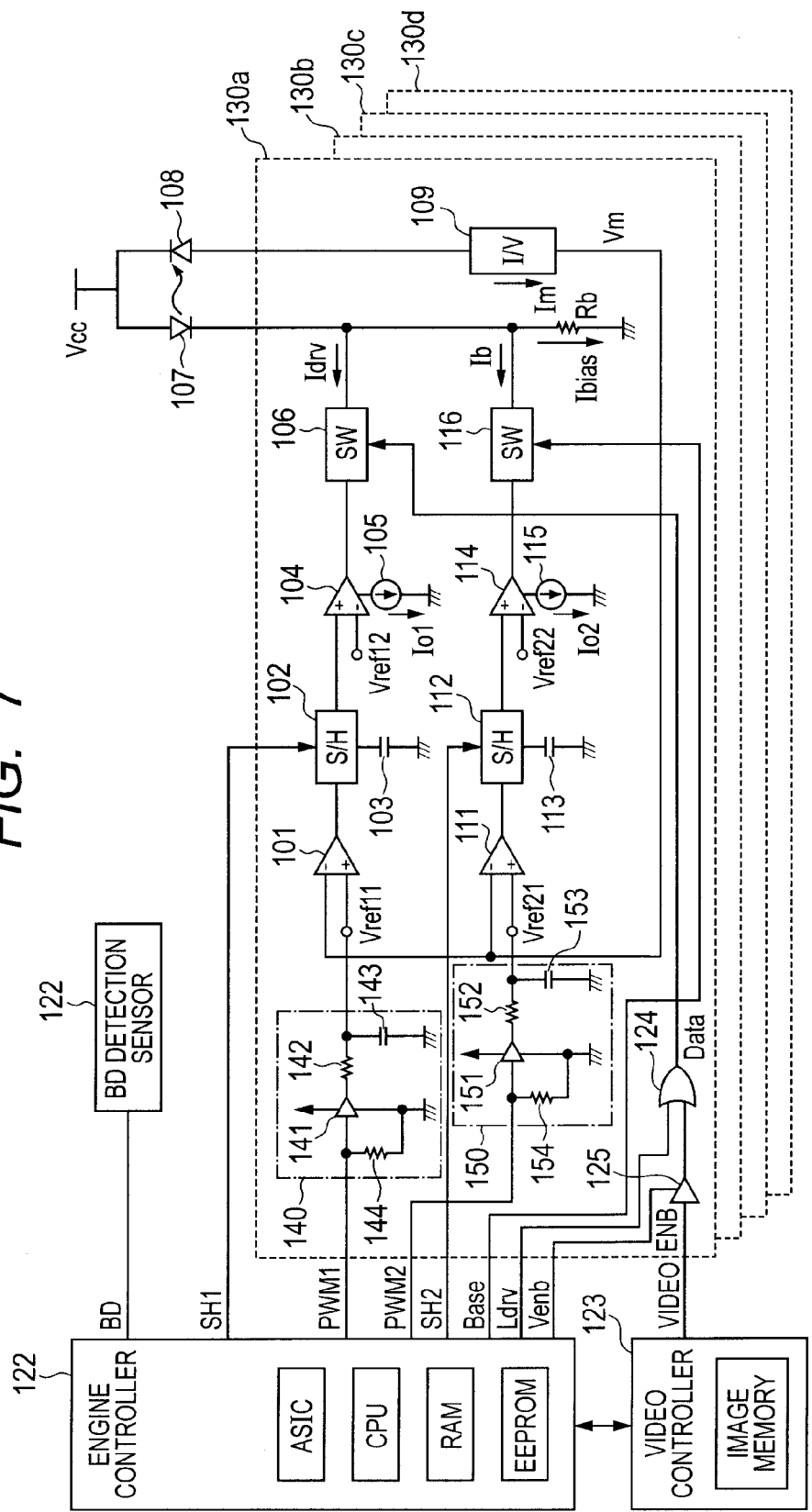
FIG. 7 illustrates another example of the laser drive circuit having the two-level light intensity adjusting function.

A circuit of FIG. 7 is different from the circuit of FIG. 5 in that a resistor Rb for causing a bias current Ibias to flow is added. The bias current Ibias is set to be lower than the threshold current Ith of the LD 107, and is set within a non-laser emission region (generally called normal LED emission region). FIG. 6B illustrates a relationship between each laser emission intensity and each current value. The effect of the bias current includes, as introduced in various documents, the improvement of warm-up characteristics of the LD 107.

In the circuit of FIG. 7, the sample/hold circuit 112 is set to a hold state by the SH2 signal, and the switching circuit 116 is turned ON, to thereby supply a drive current (Ib+Ibias) to the LD 107. In the circuit of FIG. 7, at this time, the LD 107 emits light at a weak emission level P(Ib+Ibias). In this case, the emission level P(Ib+Ibias) is in the laser emission region. Further, the sample/hold circuit 102 is set to a hold period by the SH1 signal, and the switching circuit 106 is turned ON by the Data signal, to thereby further supply the drive current Idrv. With this, a drive current (Idrv+Ib+Ibias) in total is supplied, and light is emitted at an emission level P(Idrv+Ib+Ibias) for normal printing.

As described above, the LD 107 is switched by the ON/OFF operation of the switching circuit 106 between emitting light at the emission intensity of the print level P(Idrv+Ib+Ibias) and emitting light at the weak emission level P(Ib+Ibias) with the drive current (Ib+Ibias). More specifically, the switching circuit 106 is turned ON and OFF by the Data signal resulting from the VIDEO signal under a state in which SH2 and SH1 are set to the hold period and the Base signal is set to be ON and in which the engine controller 122 sets the Venb signal to an enabled state. With this, PWM laser emission can be performed with two-level emission states between (Ib+Ibias) and (Idrv+Ib+Ibias) in terms of drive current, that is, between P(Ib+Ibias) and P(Idrv+Ib+Ibias) in terms of emission intensity (see arrows of FIG. 6B).

(Two-Level APC Sequence)

Figure 8:
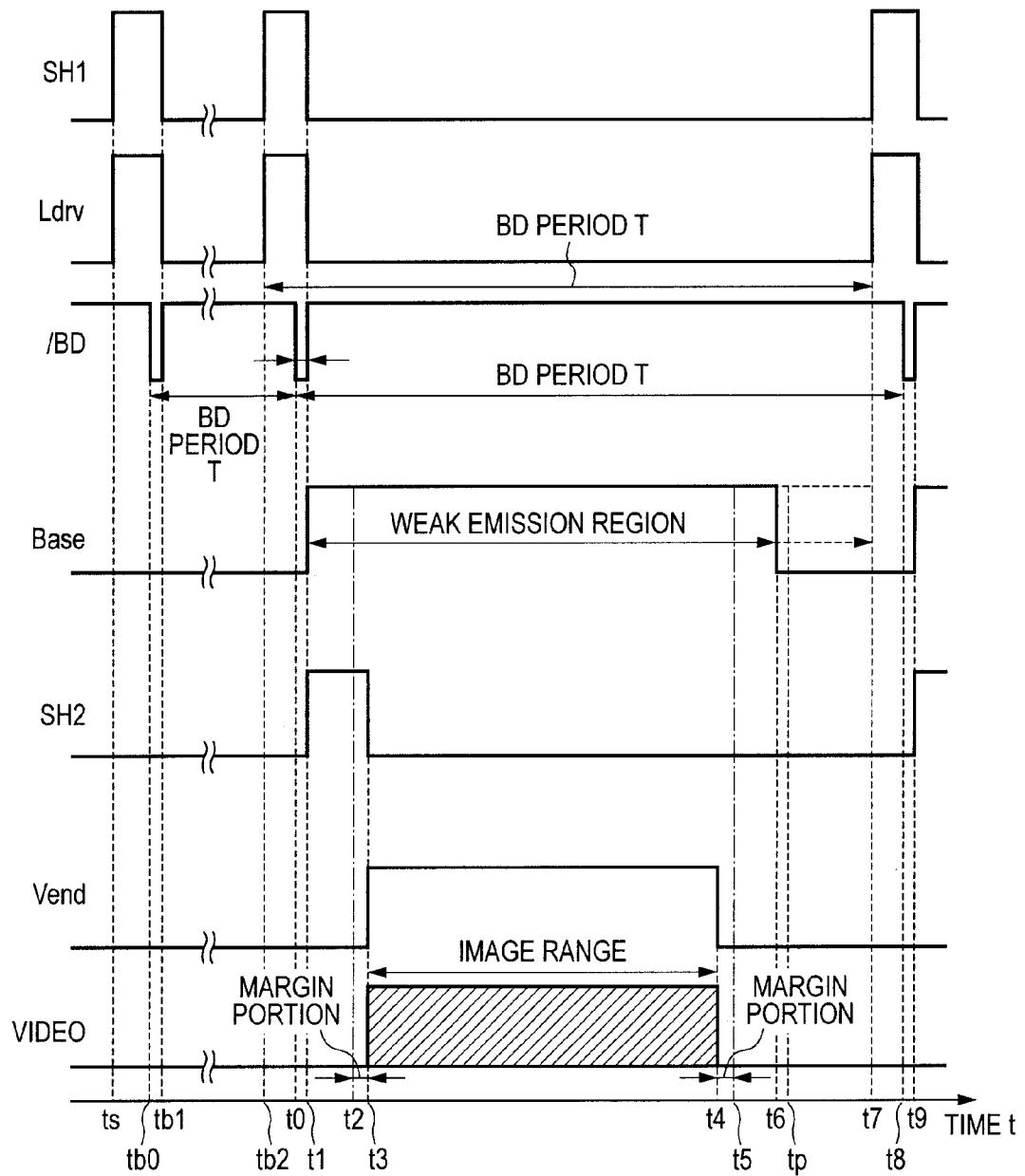
FIG. 8 is a timing chart of automatic light amount control.

Next, execution timings of various kinds of processing related to the APC for maintaining the laser emission level are described. FIG. 8 is an example of a timing chart related to laser scanning. First, at a timing ts, the engine controller 122 turns ON the SH1 signal and the Ldry signal, and turns ON the switching circuit 106. Hereinafter, the phrase "timing ts" is simply referred to as "ts", and the same applies to other such phrases. Then, an output of the BD detection sensor 121 is output as a horizontal synchronization signal /BD at tb0. At tb0, the horizontal synchronization signal /BD is detected by the engine controller 122, and then, at tb1, the engine controller 122 turns OFF both the SH1 signal and the Ldry signal, and turns OFF the switching circuit 106. This finishes the APC for the normal print level. Then, after the APC for the print level is finished, laser emission at the normal print level is performed by the LD 107 in accordance with the VIDEO signal. Then, the laser emission in accordance with the VIDEO signal is performed in a period between tb1 and tb2, but detailed description thereof is omitted.

The engine controller 122 adjusts Io1 (first drive current) with reference to the output timing (detection timing) of the horizontal synchronization signal /BD corresponding to the previous scanning line. More specifically, the engine controller 122 turns ON the SH1 signal and the Ldry signal and turns ON the switching circuit 106 at tb2 after a predetermined period of time has elapsed since the output timing (tb0 or tb1) of the horizontal synchronization signal /BD (before detection of the next horizontal synchronization signal /BD). In response thereto, the APC for the print level is started again. Upon the start of the APC, the engine controller 122 turns OFF the Venb signal, and inputs a disable instruction to the enable terminal of the buffer 125. The disable instruction has similarly been input in the previous APC. With this, even if the video controller 123 has an erroneous output (containing noise or the like), an APC-related control instruction from the engine controller 122 can be reflected on the control.

The output of the BD detection sensor 121 is output as the horizontal synchronization signal /BD at t0. At t0, the horizontal synchronization signal /BD is detected by the engine controller 122, and then, at t1, the SH1 signal and the Ldrv signal is turned OFF, and the switching circuit 106 is turned OFF, and thereby the APC for the normal print level is finished again.

Subsequently, at t1 after the detection of the horizontal synchronization signal /BD, the engine controller 122 turns ON the SH2 signal and the Base signal, and turns ON the switching circuit 116. In response thereto, the engine controller 122 starts the APC for the weak emission level. The start timing of the APC for the weak emission level may be after t1 and before t2. It is only necessary to perform the APC for the weak emission level in at least a part of the image mask period, which is after t1 and before t2. In particular, it is effective to execute the APC for the weak emission level in a margin portion period between t2 to t3. The engine controller 122 turns ON the SH2 signal until t3. In other words, the engine controller 122 maintains the APC for the weak emission level until t3. With this, a longer time period of the APC for the weak emission level can be secured. A paper end portion timing is t2, and there is a relationship of t1<t2<t3.

FIG. 9A illustrates a transition of the emission intensity of the LD 107. Further, FIG. 9B illustrates a transition of the emission intensity of the LD 107 during the PWM type weak emission. In the PWM type weak emission of FIG. 9B, in synchronization with an image clock which is a fixed frequency, light is emitted at the print level P(Idrv+Ib) every pixel (every dot) in the non-image portion at a predetermined ratio (minute pulse width corresponding to weak emission intensity). In FIG. 9B, the light amount of the weak emission level (shaded portions) is realized. In this embodiment, light is always constantly emitted at the weak emission level P(Ib), and the resultant emission intensity is set as the emission intensity of the weak emission level.

The automatic light intensity adjustment for laser is performed in a non-image region (outside an effective region of the photosensitive drum), such as between scanning lines. However, as the image forming apparatus or the light scanning device becomes more compact, a ratio of an image region by one scanning in the light scanning device increases, with the result that a ratio of a time period for the non-image region decreases. Even in such a case, according to the timing chart of FIG. 8, the automatic light intensity adjustment, which is executed when the SH2 signal is enabled, is executed after the output of the horizontal synchronization signal /BD. Accordingly, the automatic light intensity adjustment can be continued even at a timing at which laser scanning reaches a margin portion of a sheet.

Referring back to the description of FIG. 8, the engine controller 122 inputs an enable signal instruction to the enable terminal of the buffer 125 by the Venb signal at t3 after a predetermined period of time has elapsed since the output timing (t0 or t1) of the horizontal synchronization signal /BD. With this, an image mask is released. In response to the enable signal instruction to the enable terminal, the VIDEO signal is output from the video controller 123 from t3 after a predetermined period of time has elapsed since the output timing (t0 or t1) of the horizontal synchronization signal /BD. The LD 107 performs laser emission at the emission level P(Ib+Idrv) for printing, and laser scanning is performed by the optical scanning device, which has been described with reference to FIG. 4. Note that, the weak emission region (t1 to t6), in which light is emitted at the emission intensity of the weak emission level, is larger than the largest image region between t3 and t4 in which scanning is performed by the VIDEO signal, and hence weak emission is performed in a region larger than a region between the paper end portion timings. The weak emission is performed also in the non-image portion in the region of the VIDEO signal.

FIG. 9C illustrates how the LD 107 emits light when the VIDEO signal is output from the video controller 123. In the PWM type weak emission, to the emission intensity (emission period) of the weak emission level in one pixel described with reference to FIG. 9B, emission at the same print level P(Idrv+Ib) is added. In this embodiment, as illustrated in FIG. 9C, PWM emission obtained by pulse width modulation is superimposed on the weak emission level P(Ib) at which light is always emitted (FIG. 9A). From FIG. 9C, in the weak emission, radiation noise caused by the weak emission operation can be suppressed to be low as compared to the case where PWM type weak emission is performed as illustrated in FIG. 9B.

Referring back to the description of the timing chart of FIG. 8, the video controller 123 scans, in accordance with the VIDEO signal, dots of a laser beam with respect to the image region of the photosensitive drum until t4 after a predetermined period of time has elapsed since the output timing (t0 or t1) of the horizontal synchronization signal /BD. The section from t3 to t4 corresponds to a toner image formation region (electrostatic latent image formation region) and corresponds to an emission section in which laser emission is performed by the LD 107. At the same timing, the engine controller 122 inputs a disable signal instruction to the enable terminal of the buffer 125 by the Venb signal from t4 after a predetermined period of time has elapsed since the output timing (t0 or t1) of the horizontal synchronization signal /BD. This finishes the image mask release period. In other words, the other periods correspond to the image mask periods.

At t6 after a predetermined period of time has elapsed since the output timing (t0 or t1) of the horizontal synchronization signal /BD, the engine controller 122 turns OFF the switching circuit 116 by the Base signal, to thereby finish the weak emission.

At this time, the paper end portion timing is t5, and there is a relationship of t4<t5<t6. The paper end portion timing means a timing at which laser irradiation from the LD 107 is performed at a position of the belt (intermediate transfer belt), which is coincident with the edge of recording paper on the side parallel to the conveyance direction of the recording paper. In FIG. 8, the end timing t6 of the weak emission is finished before a polygon end portion timing tp (timing of shift from one surface of the polygon mirror 133 to another surface). However, the weak emission may be set so as to last until t7 (as indicated by broken line of FIG. 8).

In this manner, the automatic light intensity adjustment for the weak emission level can be performed in a region (between t1 and t6) which is wider than the image region (between t3 and t4) and wider than the region between the paper end portions (between t2 and t5).

From t7 after a predetermined period of time has elapsed since the output timing (t0 or t1) of the horizontal synchronization signal /BD, the engine controller 122 repeatedly executes the processing described above for the timing after t2. With this, when a print job is executed in response to a print request from the outside, various kinds of APC can be performed multiple times efficiently. Regarding the execution frequency of the APC, the APC may be performed every laser scanning, every page (only scanning of the first line per page), or every predetermined number of (two or more) laser scannings.

According to the timing chart of FIG. 8, the following effects can be obtained. The emission at the weak emission level (non-image portion weak emission level) is performed at such a level that a developing material such as toner is not adhered by charging on the photosensitive drum by laser irradiation. Accordingly, the setting of the emission intensity of the weak emission level (non-image portion weak emission level) can be performed at the timing of the non-image region including the effective image region of the photosensitive drum (before the image region). With this, a longer time period of the two-level APC can be secured. The processing of the timing chart of FIG. 8 is executed multiple times in each job, and hence the light amount for weak emission can be adjusted multiple times in each job. Throughout one job, the charge potential Vd can be appropriately maintained, and, as a result, the reversal fog or the positive fog can be suppressed. In the timing chart of FIG. 8, the description has been made of P(Ib) and P(Idrv+Ib). However, if P(Ib) and P(Idrv+Ib) are replaced with P(Ib+Ibias) and P(Idrv+Ib+Ibias), respectively, the same effects can be achieved also by the circuit of FIG. 7.

In the description of FIG. 8, the APC for P(Idrv) and the APC for P(Ib) have been described. However, if the APC for P(Ib) is performed earlier, the APC for P(Ib+Idrv) can be performed as well. Specifically, the APC for P(Ib) is first executed. After that, the engine controller 122 sets the sample/hold circuit 112 to a hold period by the SH2 signal, and turns ON the switching circuit 116 by the input signal Base. That is, the LD 107 is caused to perform bias emission (in laser emission region). Then, at the same time, the engine controller 122 sets the sample/hold circuit 102 to a sampling state, and turns ON the switching circuit 106 by the Data signal similarly to the above-mentioned embodiment, to thereby cause the LD 107 to perform full emission. Under a state in which the LD 107 is in the full emission state, the emission intensity of the LD 107 is monitored by the PD 108. A monitor current Im1', which is proportional to the actual emission intensity, is generated, and the monitor current Im1' is caused to flow through the current voltage conversion circuit 109 to be converted into a monitor voltage Vm1'. The current amplifier circuit 104 controls a drive current Idrv' based on a current Io1' flowing through the reference current source 105 so that the monitor voltage Vm1' matches a first reference voltage Vref11', which is a target value. In this case, the reference voltage Vref11' is a voltage value corresponding to P(Ib+Idrv). Idrv' is a difference between a current for emitting light at the light amount of P(Ib+Idrv) and a current for emitting light at the light amount of P(Ib).

Regarding the execution timing, the APC for P(Ib+Idrv) may be executed at, for example, a timing of the APC for P(Idrv) described with reference to FIG. 8. The timing of the APC for P(Ib) needs to precede the APC for P(Ib+Idrv). However, it is conceivable to perform the APC for P(Ib) before forced emission upon detection of the horizontal synchronization signal /BD. Although the description has been made of P(Ib) and P(Idrv+Ib), if P(Ib) and P(Idrv+Ib) are replaced with P(Ib+Ibias) and P(Idrv+Ib+Ibias), respectively, the same effects can be achieved also by the circuit of FIG. 7.

In the description of FIG. 8, the APC for P(Idrv) and the APC for P(Ib) are respectively executed, but the present invention is not limited to this form. For example, the APC for P(Ib+Idrv) may be performed instead of the APC for P(Ib). Specifically, after the execution of the APC for P(Idrv), the sample/hold circuit 102 is set to a hold period (non-sampling period) by the SH1 signal instructed by the engine controller 122, and the switching circuit 106 is turned ON. At the same time, the sample/hold circuit 112 is set to an APC operation period by the SH2 signal, and the switching circuit 116 is turned ON by the input signal Base. Under a state in which the LD 107 is in the full emission state, the emission intensity of the LD 107 is monitored by the PD 108. A monitor current Im2' (Im1'<Im2'), which is proportional to the actual emission intensity, is generated, and is caused to flow into the current voltage conversion circuit 109 and converted into a monitor voltage Vm2'. The current amplifier circuit 114 controls the drive current Ib based on a current Io2' flowing through the reference current source 115 so that the monitor voltage Vm2' matches a potential Vref21', which is a target value and is the sum of the first reference voltage and the second reference voltage. When the SH2 signal is turned OFF and the sample/hold circuit 112 is set to a hold state, a voltage corresponding to the drive current Ib is charged into the capacitor 113. During a non-APC operation, that is, during a period in which the sample/hold circuit 112 is in the hold period (non-sampling period) and the Base signal is ON, the LD 107 enters the full emission state whose light amount corresponds to the drive current Ib.

For example, the following modified example is possible. For example, first, an automatic light intensity adjusting circuit formed by the same components as the comparator circuit 101, the sample/hold circuit 102, the hold capacitor 103, the current amplifier circuit 104, the reference current source 105, and the switching circuit 106 is added. The automatic light intensity adjusting circuit is added so that an output of the switching circuit is connected directly beneath to the LD 107 and that a negative terminal of a comparator circuit corresponding to the comparator circuit 101 is connected to the current voltage conversion circuit 109. To the negative terminal of the comparator circuit corresponding to the comparator circuit 101, a voltage value corresponding to the drive current Idrv+Ib described in the embodiment is set in advance as a reference voltage Vref01. In this case, the engine controller 122 turns ON the switching circuit and turns OFF the input signal Base and the Ldry signal. The sampling described here may be applied to, for example, a period between t2 and t1 of FIG. 8. The obtained output of the sample/hold circuit (hold capacitor output) is input to the engine controller 122 via an A/D port (not shown), and is temporarily stored in the RAM as $V_{Idrv+Ib}$. Subsequently, the engine controller 122 turns OFF the switching circuit of the added automatic light intensity adjusting circuit and the switching circuit 116, to thereby execute APC for P(Idrv). A detailed operation thereof is as described above. The obtained output of the sample/hold circuit 102 (hold capacitor output) is input to the A/D port (not shown), and is temporarily stored in the RAM as $V_{Idrv}$. The CPU of the engine controller 122 calculates $V_{Ib}$ from a difference between $V_{Idrv+Ib}$ and $V_{Idrv}$, which are stored in the RAM, and inputs (sets) the calculated voltage value to the positive terminal of the current amplifier circuit 114 via a D/A port (not shown). The sampling described here may be applied to, for example, a period between t1 and t2 of FIG. 8. In this case, the comparator circuit 111, the sample/hold circuit 112, and the like are practically unnecessary.

According to the modified example, the automatic light intensity adjustment for P(Ib) can be executed by an indirect method instead of a direct method. The description above relates to P(Ib) and P(Idrv+Ib). However, if P(Ib) and P(Idrv+Ib) are replaced with P(Ib+Ibias) and P(Idrv+Ib+Ibias), respectively, the same effects can be achieved also by the circuit of FIG. 7.

The system for performing exposure (emission) by the laser diode 107 has been described as an example, but the present invention is not limited thereto. For example, the present invention can be carried out also in a system including an LED array as an exposure unit. Specifically, a VIDEO signal may be input to a driver for driving each LED light emitting element, and the processing of the flow chart described above may be executed.

In the above, the configuration of the image forming apparatus has been described. Hereinafter, based on the configuration illustrated in FIGS. 1A to 9C, referring to FIGS. 11 to 13, description is made of performing, by each exposure device (light irradiation unit), weak emission to a position at which the toner image is not visualized. Further, description is made of performing, by each exposure device, general emission to a position at which the toner image is visualized. In the general emission, in addition to the light amount for the weak emission, a light amount based on image data for image formation is further applied. Here, description is made of an embodiment in which respective target levels of the emission intensities P(Ib) and P(Idrv+Ib) for the weak emission and the general exposure are changed in association with the lifetime of the photosensitive drum. In the following description, as a representative example, the configuration and operation of the exposure device 31a of the first image forming station a are mainly described. Note that, the same configuration and operation are applied also in the exposure devices 31b to 31d of the second to fourth image forming stations, respectively.

(Regarding Need for Correction of Weak Emission Intensity)

Figure 10A:
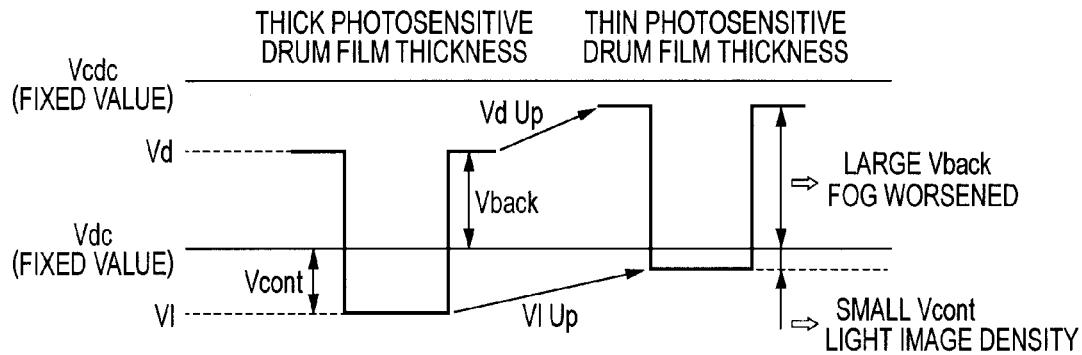
FIGS. 10A, 10B and 10C illustrate a relationship among a photosensitive drum film thickness, a charge potential, a development potential, and an exposure potential.

Referring to FIG. 10A, problems related to a difference in photosensitive drum film thickness are described. When the photosensitive drum 1 is continuously used, the surface of the photosensitive drum is deteriorated due to the discharge of the charging roller 2. Further, the surface of the photosensitive drum is worn by being brought into sliding contact with the cleaning device 5, thereby reducing the film thickness thereof. When photosensitive drums with varying usage (for example, cumulative number of rotations) are mixed, the film thicknesses of the respective photosensitive drums fluctuate. Under this state, with the shared high voltage power supply as exemplified in FIGS. 3A and 3B, the constant charge voltage Vcdc is applied to the multiple photosensitive drums. In this case, generally, the potential difference generated at an air gap between the charging roller 2 and the photosensitive drum 1 varies, and the charge potential Vd on the surface of the photosensitive drum fluctuates. Specifically, the photosensitive drum which has performed image formation less frequently has a larger film thickness, and thus the absolute value of the charge potential Vd on the surface of the photosensitive drum decreases. The photosensitive drum with a larger cumulative number of rotations has a smaller film thickness, and thus the absolute value of the charge potential Vd on the surface of the photosensitive drum increases.

For example, when the development potential Vdc and the charge potential Vd are set so that a back contrast Vback (=Vd−Vdc), which is a contrast between the development potential Vdc and the charge potential Vd, is in a desired state in the photosensitive drum having a larger thickness, as illustrated in FIG. 10A, the following problems arise. That is, in the image forming station including the photosensitive drum having a smaller film thickness, the absolute value of the charge potential Vd increases (Vd Up), and the back contrast Vback increases. When the back contrast Vback increases, toner which has been unable to be charged to the regular polarity (in the case of reversal development as this embodiment, toner charged not to the negative polarity but to 0 or positive polarity) is transferred onto a non-image portion from the developing roller, to thereby cause fog.

Further, in the image forming station including the photosensitive drum having a smaller film thickness, the charge potential Vd increases, and hence in a configuration in which the exposure intensity is constant, the exposure potential Vl (VL) also increases (Vl Up). Therefore, a development contrast Vcont (=Vdc-Vl), which is a difference value between the development potential Vdc and the exposure potential Vl (VL), decreases, and hence the toner cannot be sufficiently electrostatically-transferred onto the photosensitive drum from the developing roller, which causes easy occurrence of density reduction in a solid black image.

Figure 10B:
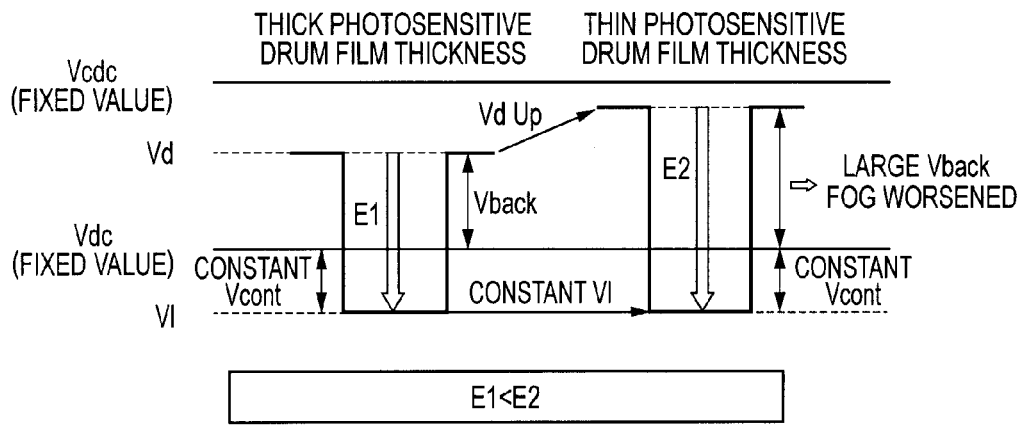

Meanwhile, as illustrated in FIG. 10B, when the development potential Vdc and the charge voltage Vcdc are fixed and the exposure intensity is changed from E1 to E2(>E1), owing to the individual control of each exposure intensity, the development contrast Vcont, which is the difference value between the development potential Vdc and the exposure potential Vl (VL), is controllable to be substantially constant. Therefore, the density can be maintained constant. However, the back contrast Vback, which is the contrast between the development potential Vdc and the charge potential Vd, increases, and hence the problem of the fog occurrence still remains.

(Regarding Correction of Emission Intensity of Weak Emission)

In this embodiment, for example, even in the case of the power supply configuration exemplified in FIGS. 3A and 3B, occurrence of the fog and density reduction can be suppressed with a simple configuration. With reference to a flowchart illustrated in FIG. 11, processing of performing the following correction is described. The correction is performed by changing, in association with the remaining lifetime of the photosensitive drums 1a to 1d, a weak exposure amount $E_0$ of each of the laser diodes 107a to 107d in a background portion (non-image portion) to which toner is not to be adhered. That is, the target voltage Vref21 of the emission level for weak emission is changed in association with the remaining lifetime of each of the photosensitive drums 1a to 1d. The scanning speed of the optical scanning device of FIG. 4 is constant.

In S101, the engine controller 122 reads information on the cumulative number of rotations of the photosensitive drum 1 as information on remaining lifetime of the photosensitive drum 1 from the storage member of each of the image forming stations. The storage member of each of the image forming stations refers to the memory tag (not shown) provided to each of the image forming stations a to d. A storage section which stores information on remaining lifetime of each of the photosensitive drums 1 is not limited to the storage member of each of the image forming stations. For example, the information read from the storage member of each of the image forming stations may be temporarily stored in another storage section, and since then, the information stored in the another storage section may be read and updated. In this case, at the time of turning OFF the power of the apparatus main body or finishing the print job, the information of another storage section is reflected to the storage section of each of the image forming stations.

The information on remaining lifetime of the photosensitive drum 1 can be restated as information related to the usage of the photosensitive drum 1 in terms of the amount of rotation and the amount of use. As described with reference to FIG. 2, the information on remaining lifetime of the photosensitive drum 1 can be also restated as information related to photosensitivity characteristics (EV curve characteristics) of the photosensitive drum 1. All expressions have the same meaning. As a modified example of the information on remaining lifetime of the photosensitive drum, other than the information on the cumulative number of rotations of the photosensitive drum, different information relative to the film thickness of the charge transporting layer 24a of the photosensitive drum can be given. Examples of the different information include information on the number of rotations of the intermediate transfer belt, information on the number of rotations of the charging roller, and information on the number of printed sheets, which takes account of the sheet size. A unit for directly detecting the film thickness of the photosensitive drum 1 may be provided so as to correspond to each of the photosensitive drums 1, and detection results thereof may be used as the information on remaining lifetime of each of the photosensitive drums 1. A value of a charge current flowing through the charging roller 2, a motor drive time of a motor for driving the photosensitive drum 1, and a drive time of a motor for driving the charging roller 2 may be used for the information on remaining lifetime of the photosensitive drum 1.

In S102, the engine controller 122 refers to a table shown in FIG. 12, which determines the correspondence relationship between the cumulative number of rotations of the photosensitive drum 1 (photosensitive drum usage) and parameters for the general exposure. The information acquired in S101 may vary among the respective photosensitive drums. Therefore, the engine controller 122 refers to the table shown in FIG. 12 for each of the photosensitive drums. The engine controller 122 sets the exposure parameter of the general exposure amount for each of the laser diodes 107a to 107d based on the information on the cumulative number of rotations acquired in S101. The exposure parameter corresponds to Vref11 of FIGS. 5 and 7. With the processing in S102, the engine controller 122 acquires a laser emission setting for setting the exposure potential Vl (VL) of each of the photosensitive drums 1 to a target potential or a potential within an allowable range regardless of the sensitivity characteristics (EV curve characteristics) of each of the photosensitive drums 1. When the laser diodes 107a to 107d perform general emission with this acquired setting, variability of post-exposure potentials Vl (VL) of the respective multiple photosensitive drums 1 after general exposure are at least reduced. The target exposure potentials of the respective photosensitive drums 1 are basically the same or substantially the same, but depending on cases, the target exposure potentials may be individually set in accordance with the characteristics of the respective photosensitive drums 1. When the term "exposure" is used for the parameter, the term is used from the standpoint that the exposure is performed with respect to the photosensitive drum. When the exposure is performed with respect to the photosensitive drum, there exists an emission side corresponding thereto. Therefore, when the term "exposure" is used for the parameter, it can be said that the parameter is also a parameter for "emission."

The operation performed by the engine controller 122 in S102 is described in more detail. The engine controller 122 first sets, by a PWM signal instruction, values of emission brightness (mW), which correspond to the acquired accumulated information of the respective photosensitive drums 1, to Vref11a to Vref11d, respectively. FIG. 12 shows the emission brightness value (mW) for the purpose of description, but actually, the engine controller 122 sets, by the PWM signal instruction, voltage values/signals, which correspond to the emission brightness values, as Vref11a to Vref11d, respectively. Further, the engine controller 122 sets the % (PWM) value of the general exposure (density 0%) in FIG. 12 to $PW_{MIN}$, and sets the PWM value of the general exposure (100%) to $PW_{255}$. The engine controller 122 sets a pulse width with respect to image data with an arbitrary gradation value n (=0 to 255) based on Expression (1) below.

$$PW_n = n \times (PW_{255} - PW_{MIN})/255 + PW_{MIN} \qquad \text{Expression (1)}$$

According to Expression (1), $PW_0 = PW_{MIN}$ is obtained when n=0, and $PW_{255}$ is obtained when n=255. In the following steps, when emission for image data with the arbitrary gradation value n is instructed from the outside, the engine controller 122 instructs a voltage value/signal corresponding to the set pulse width ($PW_n$) as a VIDEO signal a. The same applies to VIDEO signals b to d. Expression (1) assumes a case of an 8-bit multivalued signal, but in a case of an arbitrary m-bit multivalued signal, such as a 4-bit, 2-bit, or 1-bit (binary) multivalued signal, the following may be applied. That is, the pulse width at the time of $PW_{MIN}$ may be allocated when the image data is 0, and the pulse width at the time of $PW_{255}$ may be allocated to the gradation value ($2^m - 1$).

The subsequent step is described. In S103, the engine controller 122 sets, based on the cumulative number of rotations of the photosensitive drum 1, Vref21 as a parameter (emission brightness (mW) in FIG. 12) for the laser emission intensity $E_0$ in weak exposure. Also in S103, the engine controller 122 refers to the table shown in FIG. 12 for each of the photosensitive drums. Specifically, the engine controller 122 reads the Vref21 values (PWM values) corresponding to the cumulative information acquired in S101 for the respective photosensitive drums, and sets the Vref21 values to Vref21a to Vref21d, respectively. With this processing in S103, the engine controller 122 acquires a setting for setting the charge potential Vd of each of the photosensitive drums 1 to a target potential (value of post-correction charge potential Vd_bg) or a potential within an allowable range regardless of the sensitivity characteristics (EV curve characteristics) of the photosensitive drum. The LD driver 130 performs the APC with this acquired setting, and under this control, the laser diodes 107a to 107d are caused to perform weak emission. Thereby, variability of post-correction charge potentials at the background portions (non-image portion) of the respective multiple photosensitive drums 1 are at least reduced. The target exposure potentials (corresponding to Vref11 values) of the respective photosensitive drums are basically the same or substantially the same, but depending on cases, the target exposure potentials may be individually set in accordance with the characteristics of the respective photosensitive drums 1.

With the processing of S102 and S103, it is possible to set the exposure amount of the weak exposure (weak emission) and the exposure amount of the general exposure (general emission) appropriately in association with the remaining lifetime of each of the photosensitive drums. In S102 and S103, a form in which the engine controller 122 refers to the table of FIG. 12 is described, but the present invention is not necessarily limited to this form. For example, the CPU in the engine controller 122 may compute a calculation expression. Alternatively, the CPU may perform the computation to obtain desired setting values (Vref11a to Vref11d or Vref21a to Vref21d) from the parameter of the remaining lifetime of the photosensitive drum 1 (for example, the cumulative number of rotations of the photosensitive drum). All values computed by Expression (1) may be stored in advance in a table, and the engine controller 122 may refer to the table at each time. The memory tag (not shown) may store multiple types of EV curves corresponding to the respective states of usage of the photosensitive drum 1 as illustrated in FIG. 2. In this case, the engine controller 122 specifies the EV curve in accordance with the acquired information on the usage of the photosensitive drum 1. Further, the engine controller 122 computes the necessary exposure amount ($\mu J/cm^2$) from the specified EV curve and a desired photosensitive drum potential. Further, the engine controller 122 computes, from the exposure amount ($\mu J/cm^2$) determined at each time, the emission brightness, the pulse width at the time of weak exposure, and the pulse width at the time of general exposure. The engine controller 122 sets the results thereof as the parameters corresponding to S102 and S103.

Referring back to the description of FIG. 11, in S104, in response to the control instruction from the engine controller 122, the respective members execute the series of image formation operation and control described with reference to FIG. 1A. In S105, the engine controller 122 measures the number of rotations of each of the photosensitive drums 1a to 1d, which has been rotated in the series of image formation. This measurement processing is performed in order to update the usage of the photosensitive drum 1. The processing of S105 is actually executed in parallel with the processing of S104.

The engine controller 122 determines in S106 whether or not the image formation has been finished. When it is determined that the image formation has been finished in S106, the processing proceeds to S107. In S107, the engine controller 122 adds the measurement result of each of the photosensitive drums 1 obtained in S105 to the corresponding cumulative number of rotations. In S108, the engine controller 122 stores the updated cumulative number of rotations in the non-volatile memory tag (not shown) of each of the image forming stations. In the processing of S108, the information on remaining lifetime of the photosensitive drum 1 is updated. The storage destination in this case may be another storage section different from the memory tag (not shown) described in S101.

(Description of Table for Correction)

Figure 11:
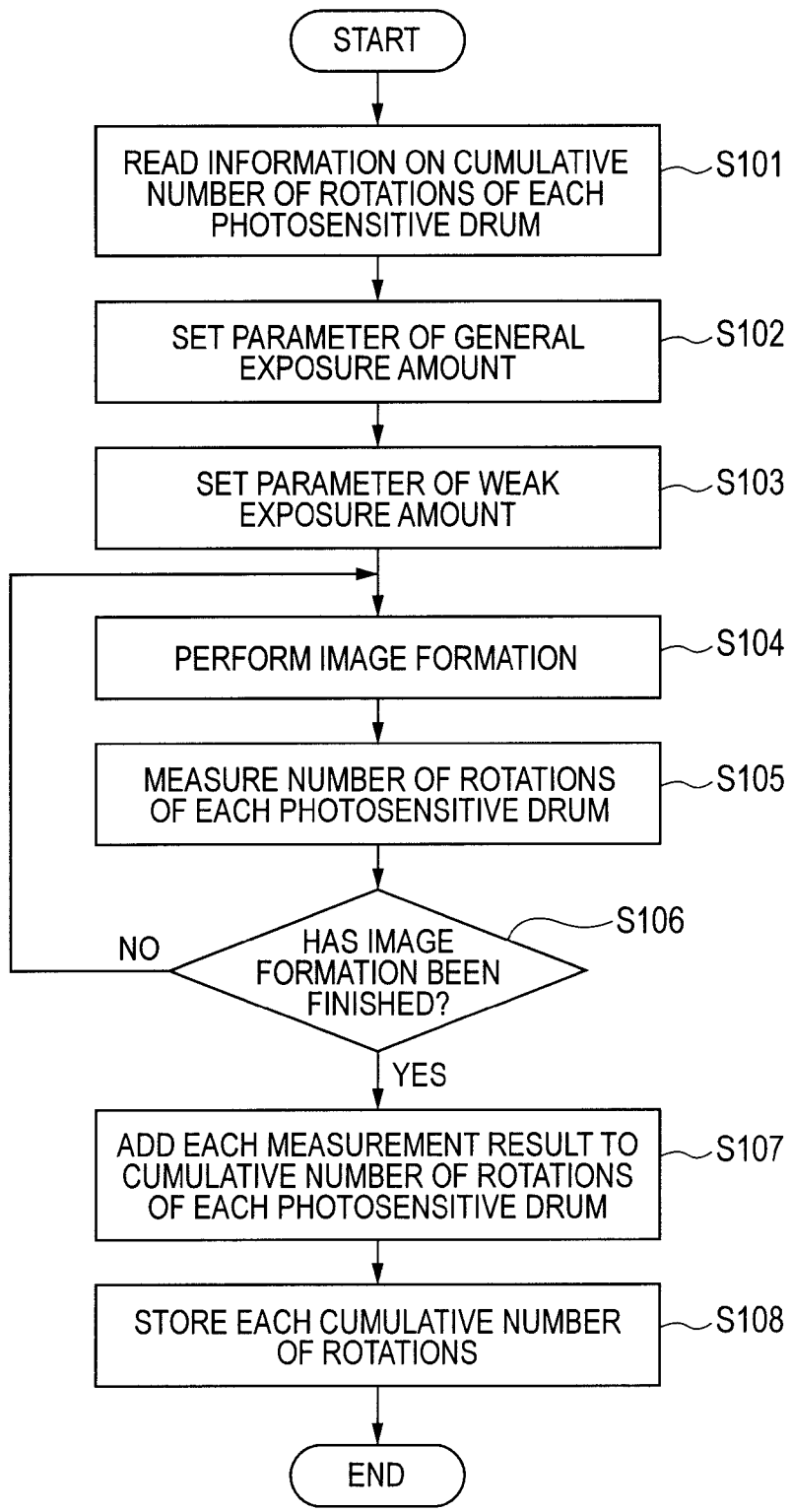
FIG. 11 is a flowchart illustrating setting processing of a general exposure parameter and a weak exposure parameter, image formation processing, and update processing of photosensitive drum usage.

FIG. 12 shows an example of details of a table to which the engine controller 122 refers in S102 and S103 of FIG. 11. In the table of FIG. 12, the information on remaining lifetime of the photosensitive drum 1 (in FIG. 12, "number of rotations of drum" corresponding to the cumulative number of rotations) is associated with the emission control setting at the time of weak exposure or at the time of general exposure. This table is stored in the storage section to which the engine controller 122 can refer, and for example, stored in the memory tag (not shown) provided in each of the first to fourth (a to d) image forming stations.

In FIG. 12, the exposure amount ($\mu J/cm^2$) of the weak exposure and the exposure amount ($\mu J/cm^2$) of the general exposure are set in advance based on the photosensitivity characteristics (EV curve) of the target photosensitive drum 1, as exemplified in FIG. 2. Further, in FIG. 12, the setting corresponding to the emission brightness (mW) of the weak exposure is represented by Vref21 and the PWM value corresponding thereto. The setting corresponding to the added emission brightness (mW) for causing the laser diode 107 to emit light at the emission brightness (mW) of the general exposure is represented by Vref11 and the PWM value corresponding thereto. The setting of Vref11 is a setting for realizing the added emission brightness (mW) in FIGS. 5 and 7, and corresponds to the added emission brightness in FIG. 12. The engine controller 122 refers to the table shown in FIG. 12, and thus variability of the surface potentials in the background portions of the respective multiple photosensitive drums after charging can be eliminated or at least reduced. Variability of the post-exposure potentials Vl (VL) of the respective multiple photosensitive drums 1 after the general exposure can also be eliminated or at least reduced.

In the table exemplified in FIG. 12, both of the emission brightness (mW) during weak exposure and the emission brightness (mW) during general exposure vary. Through reference to the table of FIG. 12, the engine controller 122 can perform appropriate setting for the general exposure as well as the weak exposure in association with the cumulative number of rotations of the photosensitive drum 1.

In FIG. 12, the emission control parameters at the time of weak exposure and the emission control parameters at the time of general exposure are shown with respect to a certain range of the cumulative number of rotations of the photosensitive drum 1, but the condition may be set in more detail. For example, with the CPU of the engine controller 122, from the relationship between the number of rotations of the drum and each emission control setting value in the table, an appropriate emission control setting value with respect to the arbitrary number of rotations of the drum may be presumed and calculated (predicted and computed). Further, the same applies also in the case of the general exposure. In this manner, the accuracy of intensity of emission by the laser diode 107 during weak exposure or that during general exposure can be further enhanced. Further, with reference to the table of FIG. 12, a case is described, in which both of the weak exposure amount and the general exposure amount linearly increase in accordance with the cumulative number of rotations of the photosensitive drum 1. However, the present invention is not limited thereto. In view of the characteristics of the photosensitive drum 1, there may be provided a table in which the exposure amounts non-linearly increase in accordance with the cumulative number of rotations of the photosensitive drum 1.

(Description of Action and Effect)

Figure 10C:
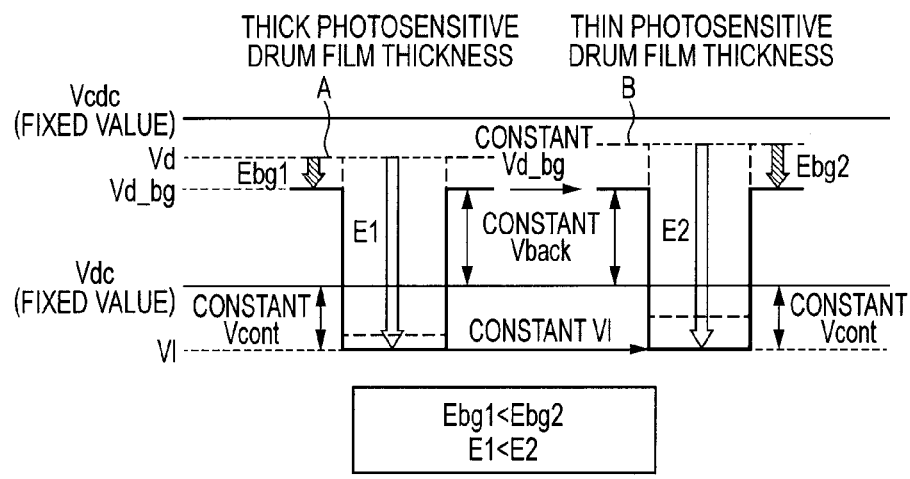

With reference to FIG. 10C, an action and effect by processing of the flowchart of FIG. 11 is described. In this embodiment, the film thickness of the charge transporting layer 24 of the photosensitive drum 1 is 20 μm when largest (the photosensitive drum 1 in the initial state), and the charge potential Vd is about −600 V after passage through the charging roller 2 (see FIG. 2). When the cumulative number of rotations of the photosensitive drum 1 increases and the film thickness of the charge transporting layer 24 reduces, the charge potential Vd becomes about −700 V and the charge potential Vd varies by about −100 V. When the photosensitive drums with varying usage are mixed, or when the photosensitive drums with varying characteristics are mixed, difference is generated in the EV characteristics among the photosensitive drums.

When the charge transporting layer 24 is thinned, the charge potential Vd increases (see FIGS. 10A and 10B), and hence in the case where the exposure amount of the image portion exposure is set constant, the post-exposure potential Vl (VL) increases (FIG. 10A). The exposure amount during full emission is increased from E1 to E2 in accordance with the cumulative number of rotations of the photosensitive drum, which is inversely proportional to the film thickness of the charge transporting layer 24, and the post-exposure potential Vl (VL) is maintained substantially constant as the solid line portion in FIG. 10C. Therefore, the development contrast Vcont (=Vdc−Vl), which is a difference value between the development potential Vdc and the exposure potential Vl (VL), can be maintained at a constant value regardless of the film thickness of the charge transporting layer 24 of the photosensitive drum 1.

Thus, occurrence of image density reduction is suppressed.

As the value of the cumulative number of rotations of the photosensitive drum 1 increases, the laser light amount during non-image portion exposure is increased from Ebg1 to Ebg2. This is as described with reference to the table of FIG. 12. Even when a constant DC voltage is applied to the charging rollers 2a to 2d, it is possible to correct the amount of increase (difference between A and B of FIG. 10C) of the charge potential Vd caused by the film thickness change of the charge transporting layer 24 of the photosensitive drum 1. With this, as indicated by the bold solid line in FIG. 10C, the post-correction charge potential Vd_bg in the non-image portion is substantially constant regardless of the film thickness of the charge transporting layer 24. Even when the development potential Vdc is a constant value, the back contrast Vback, which is a potential difference between the development potential Vdc and the post-correction charge potential Vd_bg, is maintained constant. This point differs from the case exhibiting only E1<E2 as illustrated in FIG. 10B. In this manner, it is possible to suppress the fog caused when toner which has been unable to be charged to the regular polarity (in the case of the reversal development, toner charged not to the negative polarity but to 0 or positive polarity) is transferred onto the non-image portion.

Figure 13:
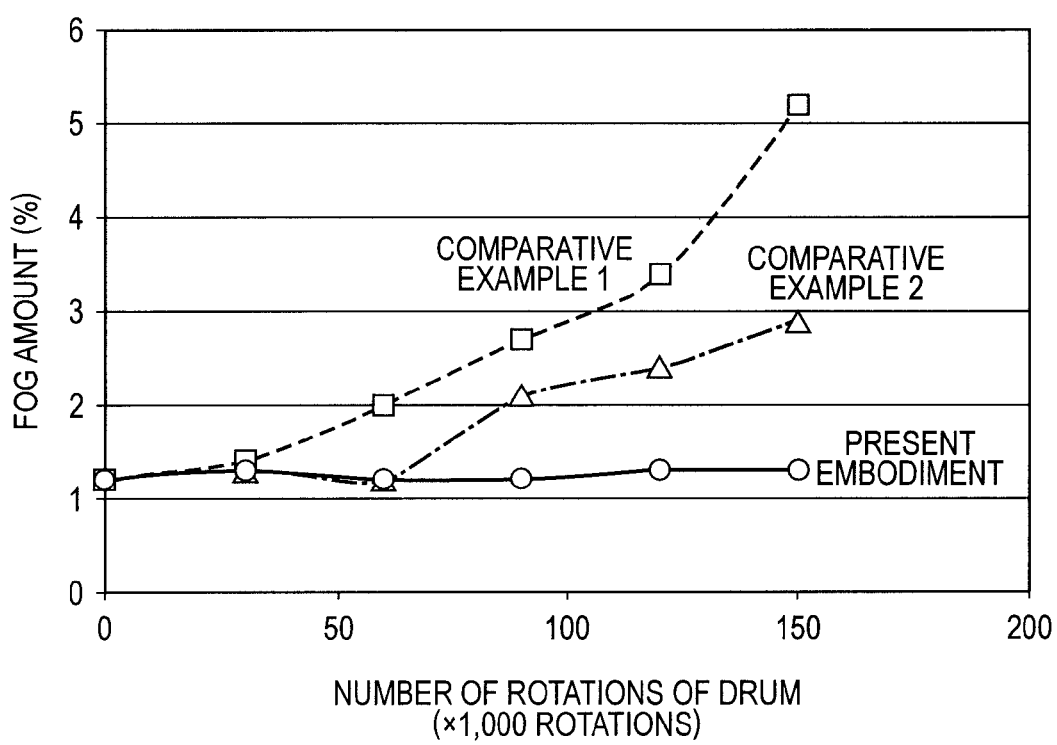
FIG. 13 illustrates an effect related to a fog amount.

FIG. 13 illustrates image quality evaluation transitions of comparative examples and a case where the weak exposure condition is changed by the above-mentioned system. In FIG. 13, Comparative Example 1 represents a case where no correction is performed for the background portion potential Vd by the weak exposure or the like. Comparative Example 2 represents a case where the high voltage power supply circuit controls the charge potential Vcdc to perform correction of the background portion potential Vd. The term "correction" refers to, for example, a correction in which Vd_bg in FIG. 10C is set as a target potential.

FIG. 13 illustrates the transition of the fog amount M. In Comparative Example 1 of FIG. 13, the charge potential Vd increases along with the increase of the cumulative number of rotations of the photosensitive drum, and hence the reversal fog, which is caused by the increase of the potential difference between the background portion potential and the development potential, is significantly worsened.

In Comparative Example 2 of FIG. 13, the reversal fog is not worsened. However, along with the progress of usage, the charging roller 2 is contaminated and the fog occurs locally at a portion at which the background portion potential is low, and thus the total fog amount tends to increase. The reason is as follows. In the control of the charge potential Vcdc, in a case of this embodiment, the charge potential Vcdc is set so as to set the surface of the photosensitive drum to, for example, −700 V, but in Comparative Example 2, the charge potential Vcdc is set so as to set the surface of the photosensitive drum to, for example, −600 V. When the charge potential Vcdc is small, the charge potential contrast between the contaminated portion and the uncontaminated portion of the charging roller 2 tends to increase. That is, the tendency of charge ability reduction in the contaminated portion of the charging roller 2 more markedly appears in the case of a small charge potential Vcdc than the case of a large charge potential Vcdc.

According to this embodiment, the charge potential (background portion potential) is maintained constant to suppress worsening of the reversal fog, and in addition, the exposure amount $E_0$ for weak exposure is increased to ensure a sufficient smoothing effect. In addition to this effect, without causing reduction in uniformity of the charge potential due to the contamination of the charging roller and the like, the background portion potential can be formed. Therefore, it is possible to take an effective countermeasure against increase in background portion potential and reduction in uniformity caused along with the progress of the usage degree. The background portion potential is maintained constant in each of the image forming stations, and hence there is an advantage that, even when a voltage is supplied from the same power supply to the respective developing rollers, the worsening of the fog can be suppressed.

(Modified Example)

In the description above, in both cases of FIGS. 3A and 3B, a one shared power supply (corresponding to transformer 53) is used as a high voltage power supply for the charging rollers 2 and the developing rollers 43. However, as is clear from the description of FIGS. 10A and 10B, the present invention is also effective in a case power supply control for charging cannot be performed independently among colors and power supply control for development cannot be performed independently among colors. That is, one power supply (corresponding to one transformer) for the multiple charging rollers, and one power supply (corresponding to one transformer) for the multiple developing rollers may be provided. With the description of "a first power supply" and "a second power supply," the respective power supplies are distinguished. In this case, a voltage output from the one power supply for charging (first power supply voltage) or a voltage obtained by converting the above-mentioned voltage by a converter (first conversion voltage) is input to the respective charging rollers 2a to 2d. A voltage output from the one power supply for development (second power supply voltage) or a voltage obtained by converting the above-mentioned voltage by a converter (second conversion voltage) are input to the respective developing rollers 43a to 43d. As described with reference to FIGS. 3A and 3B, a variety of voltages may be input to the individual rollers (charging rollers and developing rollers). For example, the power supply voltage (first power supply voltage or second power supply voltage) of each of the power supplies (a first power supply and a second power supply) may be directly input to the charging rollers 2a to 2d or the developing rollers 43a to 43d. Alternatively, a voltage obtained by converting the power supply voltage of each of the power supplies by a converter (first conversion voltage or second conversion voltage) may be at least one of divided and dropped by an electronic element having fixed voltage drop characteristics, and the obtained voltage (first voltage or second voltage) may be input to the charging rollers 2a to 2d or the developing rollers 43a to 43d.

In the description above, when the voltage is dropped/boosted, a case of performing at least one of dividing and dropping the voltage by the electronic element having the fixed voltage drop characteristics has been described. However, the processing of weak exposure in the flowchart of FIG. 11 is also effective in a case where a DC-DC converter having a specific function is provided to the individual charging roller or developing roller. That is, in the case of the situation illustrated in FIG. 10A, when the voltage conversion ability of the DC-DC converter is insufficient, Vd_bg illustrated in FIG. 10C cannot be realized only by the voltage conversion ability thereof. In such a case, the formation of the potential lacking only by the DC-DC converter is compensated for by the weak exposure processing, and thus the charge potential Vd_bg may be realized.

According to the embodiments described above, it is possible to solve problems caused by the charge potential of the photosensitive drum by coping with variability or variations in photosensitivity characteristics (EV curve characteristics) of the photosensitive drums in the apparatus, and appropriately controlling the charge potential of each of the photosensitive drums with a simpler configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-114859, filed May 23, 2011, which is hereby incorporated by reference herein in its entirety.

What is claimed is:

1. A color image forming apparatus which has a light irradiation unit irradiating a charged photosensitive member with light to form an electrostatic latent image, the color image forming apparatus comprising:

a light emitting element emitting light and provided in the light irradiation unit;

a laser driving unit causing the light emitting element to emit light in accordance with an input of print data, the laser driving unit causing the light emitting element to emit light of a light amount at a first emission level for visualizing a toner image onto a first area where the toner image is to be visualized on the charged photosensitive member and to emit light of a light amount at a second emission level for weak emission onto a second area where the toner is not to be adhered to the charged photosensitive member, wherein the laser driving unit supplies a drive current for the first emission level to the light emitting element so that the light emitting element emits light of the light amount at the first emission level, and the laser driving unit supplies a drive current for the second emission level to the light emitting element so that the light emitting element emits light of the light amount at the second emission level;

an acquiring unit acquiring information of an integrated number of rotations of the photosensitive member; and a drive current adjusting unit adjusting the drive current for the second emission level, the drive current adjusting unit changing a magnitude of the drive current for the second emission level in accordance with the information of the integrated number of rotations of the photosensitive member acquired by the acquiring unit.

2. The color image forming apparatus according to claim 1, wherein the drive current adjusting unit changes a magnitude of the drive current for the first emission level in accordance with the information of the integrated number of rotations of the photosensitive member acquired by the acquiring unit.

3. The color image forming apparatus according to claim 2, wherein the drive current adjusting unit is configured to increase the magnitude of the drive current for the first emission level as the integrated number of rotations of the photosensitive member increases.

4. The color image forming apparatus according to claim 1, wherein the magnitude of the drive current for the first emission level and the magnitude of the drive current for the second emission level are independently controllable by the drive current adjusting unit.

5. The color image forming apparatus according to claim 1, further comprising:
a power supply which is a single power supply, wherein the power supply supplies power to a charging unit which charges the photosensitive member, and to a developing unit which visualizes a latent image formed on the photosensitive member with toner,
wherein the charging unit is supplied with one of a power supply voltage output from the power supply, a conversion voltage obtained by converting the power supply voltage by a converter, and a voltage obtained by at least one of dividing and dropping one of the power supply voltage and the conversion voltage by an element having fixed voltage drop characteristics, and
wherein the developing unit is supplied with one of a conversion voltage obtained by converting the power supply voltage by a converter, and a voltage obtained by at least one of dividing and dropping one of the power supply voltage and the conversion voltage by an element having fixed voltage drop characteristics.

6. The color image forming apparatus according to claim 1, further comprising:
a first power supply which is a single power supply, wherein the first power supply supplies power to a plurality of charging units which charge a plurality of photosensitive members; and
a second power supply which is a single power supply, wherein the second power supply supplies power to a plurality of developing units which visualize latent images formed on the plurality of photosensitive members with toner,
wherein the plurality of charging units is supplied with one of a first power supply voltage output from the first power supply, a first conversion voltage obtained by converting the first power supply voltage by a converter, and a first voltage obtained by one of dividing and dropping one of the first power supply voltage and the first conversion voltage by an element having fixed voltage drop characteristics, and
wherein the plurality of developing units is supplied with one of a second power supply voltage output from the second power supply, a second conversion voltage obtained by converting the second power supply voltage by a converter, and a second voltage obtained by one of dividing and dropping one of the second power supply voltage and the second conversion voltage by an element having fixed voltage drop characteristics.

7. The color image forming apparatus according to claim 1, wherein the drive current adjusting unit is configured to increase the magnitude of the drive current for the second emission level as the integrated number of rotations of the photosensitive member increases.

8. The color image forming apparatus according to claim 1, wherein the first area and the second area are included in an area on the photosensitive member where the latent image, which is visualizable as the toner image, can be formed.

9. An image forming apparatus which has a light irradiation unit irradiating a charged photosensitive member with light to form an electrostatic latent image, the image forming apparatus comprising:
a light emitting element emitting light and provided in the light irradiation unit;
a laser driving unit causing the light emitting element to emit light in accordance with an input of print data, the laser driving unit causing the light emitting element to emit light of a light amount at a first emission level for visualizing a toner image onto a first area where the toner image is to be visualized on the charged photosensitive member and to emit light of a light amount at a second emission level for weak emission onto a second area where the toner is not to be adhered to the charged photosensitive member, wherein the laser driving unit supplies a drive current for the first emission level to the light emitting element so that the light emitting element emits light of the light amount at the first emission level, and the laser driving unit supplies a second drive current for the second emission level to the light emitting element so that the light emitting element emits light of the light amount at the second emission level;
an acquiring unit acquiring information of an integrated number of rotations of the photosensitive member; and
a drive current adjusting unit adjusting the drive current for the second emission level, the drive current adjusting unit changing a magnitude of the drive current for the second emission level in accordance with the information of the integrated number of rotations of the photosensitive member acquired by the acquiring unit.

10. The image forming apparatus according to claim 9, wherein the drive current adjusting unit changes a magnitude of the drive current for the first emission level in accordance with the information of the integrated number of rotations of the photosensitive member acquired by the acquiring unit.

11. The image forming apparatus according to claim 10, wherein the drive current adjusting unit is configured to increase the magnitude of the drive current for the first emission level as the integrated number of rotations of the photosensitive member increases.

12. The image forming apparatus according to claim 9, wherein the magnitude of the drive current for the first emission level and the magnitude of the drive current for the second emission level are independently controllable by the drive current adjusting unit.

13. The image forming apparatus according to claim 9, further comprising:
   a power supply which is a single power supply, wherein the power supply supplies power to a charging unit which charges the photosensitive member, and to a developing unit which visualizes a latent image formed on the photosensitive member with toner,
   wherein the charging unit is supplied with one of a power supply voltage output from the power supply, a conversion voltage obtained by converting the power supply voltage by a converter, and a voltage obtained by at least one of dividing and dropping one of the power supply voltage and the conversion voltage by an element having fixed voltage drop characteristics, and
   wherein the developing unit is supplied with one of a conversion voltage obtained by converting the power supply voltage by a converter, and a voltage obtained by at least one of dividing and dropping one of the power supply voltage and the conversion voltage by an element having fixed voltage drop characteristics.

14. The image forming apparatus according to claim 9, wherein the drive current adjusting unit is configured to increase the magnitude of the drive current for the second emission level as the integrated number of rotations of the photosensitive members increases.

15. The color image forming apparatus according to claim 9, wherein the first area and the second area are included in an area on the photosensitive member where the latent image, which is visualizable as the toner image, can be formed.

* * * * *